(12) United States Patent
McConnell et al.

(10) Patent No.: US 6,373,930 B1
(45) Date of Patent: Apr. 16, 2002

(54) METHOD AND SYSTEM FOR MONITORING TELECOMMUNICATIONS TRAFFIC

(75) Inventors: Von K. McConnell, Leawood; Thomas M. Sladek, Overland Park; Baoquan Zhang, Overland Park; Kenneth C. Jackson, Overland Park, all of KS (US)

(73) Assignee: Sprint Communications Company L.P., Kansas City, MO (US)

( * ) Notice: Subject to any disclaimer, the term of this patent is extended or adjusted under 35 U.S.C. 154(b) by 0 days.

(21) Appl. No.: 09/392,984

(22) Filed: Sep. 9, 1999

(51) Int. Cl.[7] .......................... H04M 15/00; H04M 7/00
(52) U.S. Cl. ............................ 379/114.28; 379/114.17; 379/114.2; 379/114.29; 379/144.01; 379/230; 455/406
(58) Field of Search ................................ 379/111, 112, 379/113, 114, 115, 120, 121, 123, 124, 127, 130, 131, 133, 134, 140, 143, 144, 207, 219, 220, 229, 230, 211; 455/406, 433, 455

(56) References Cited

U.S. PATENT DOCUMENTS

| | | | | |
|---|---|---|---|---|
| 5,621,787 A | * | 4/1997 | McKoy et al. | 379/144 |
| 5,765,108 A | | 6/1998 | Martin et al. | 455/422 |
| 5,864,604 A | * | 1/1999 | Moen et al. | 379/88.01 |
| 5,991,377 A | * | 11/1999 | Malik | 379/114 |
| 5,995,822 A | * | 11/1999 | Smith et al. | 455/406 |
| 6,038,309 A | * | 3/2000 | Ram et al. | 379/229 |
| 6,044,259 A | * | 3/2000 | Hentila et al. | 455/406 |
| 6,075,855 A | * | 6/2000 | Christiansen et al. | 379/221 |

OTHER PUBLICATIONS

UWC Pre–Paid Charging Stage 2, 1/99.
AG Communication Systems—web pages, Jun. 23, 1999.
Wireless Intelligent Network Capabilities for Pre–Paid Charging—Chapter 2—Modifications to TIA/EIA–664, Feb. 16, 1999.
Lucent PrePaid Solution for GSM Networks, 11/98.
"Intelligent Networks Mobile Services (GSM)—PrePaid—Target New Market, Generate New Usage and Revenue Growth", Lucent Technologies—web pages, Jul. 13, 1999.
"Prepaid Wireless: It's Not Just for the Credit–Challenged Anymore", CTI Magazine, web site, Jul. 19, 1999.
AGCS flow charts, around Apr. 16, 1998.

* cited by examiner

Primary Examiner—Binh Tieu
(74) Attorney, Agent, or Firm—Harley R. Ball; Steven J. Funk; Kevin D. Robb

(57) ABSTRACT

A method and system for monitoring telecommunications traffic is disclosed. When a switch receives a call request, the switch sends a query message to a service controller. The service controller identifies the call request as a request to place a special service call and therefore returns to the switch a special service code, which causes the switch to route the call via a special looparound circuit to a destination. A signaling path associated with the looparound circuit passes through a designated network entity, which can therefore monitor the start and end of the call. An SCP or other network entity can then take appropriate action in response to the status of the call. The invention is particularly useful in facilitating robust account balance service such as prepaid calling.

25 Claims, 10 Drawing Sheets

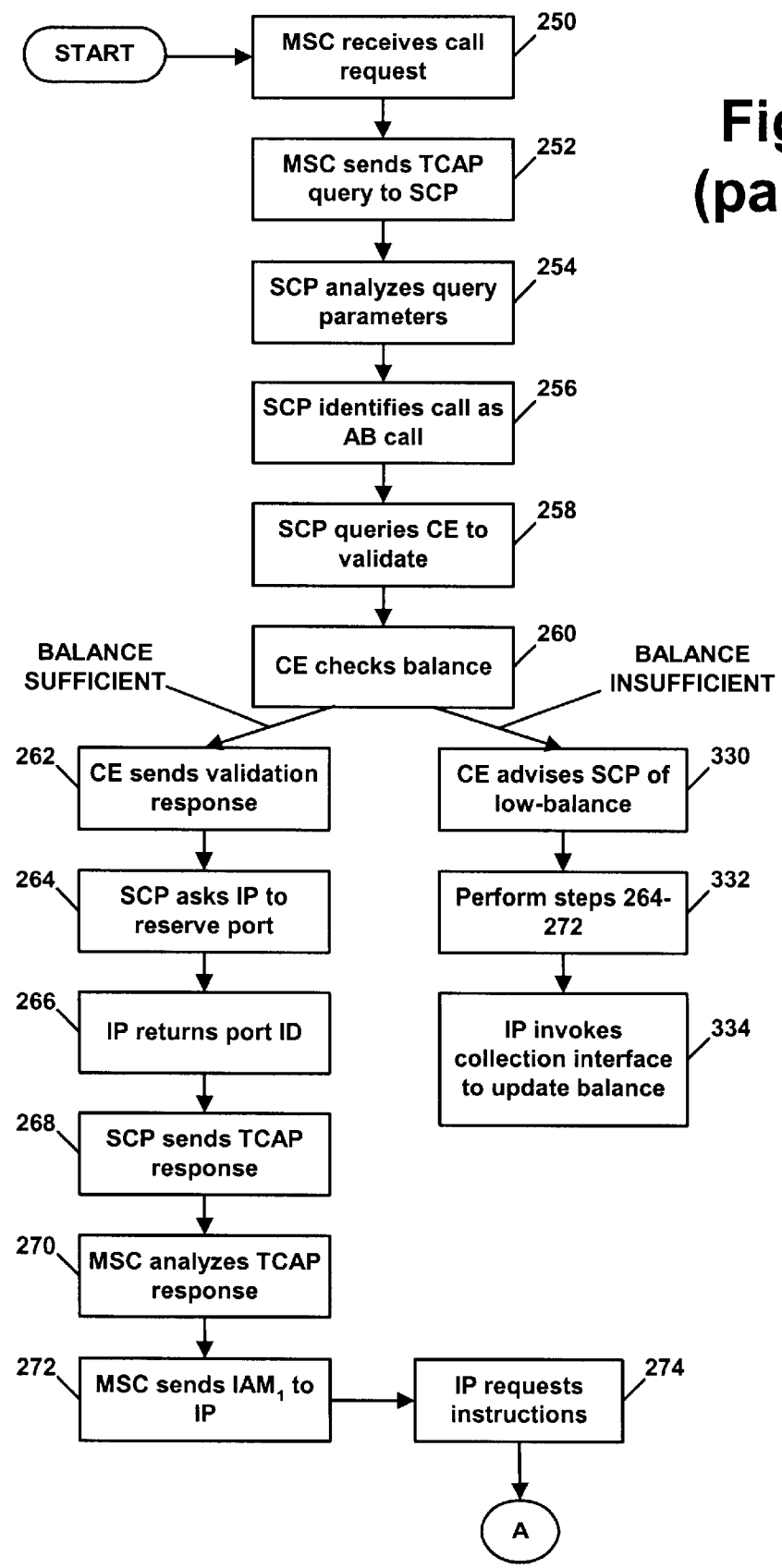
Fig. 9 (part A)

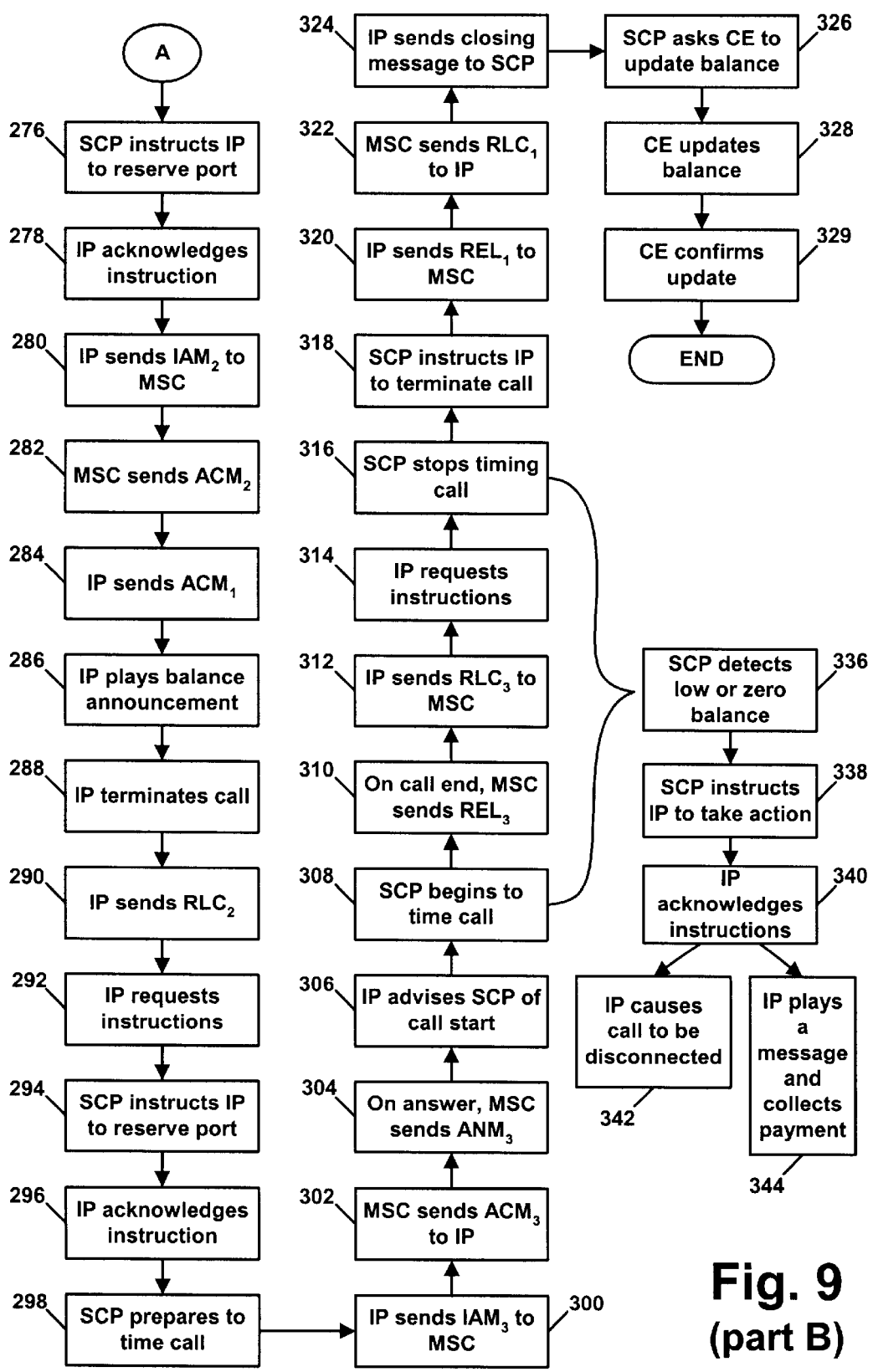
Fig. 9 (part B)

METHOD AND SYSTEM FOR MONITORING TELECOMMUNICATIONS TRAFFIC

BACKGROUND OF THE INVENTION

1. Field of the Invention

The present invention relates in general to telecommunications systems and more particularly to a method and system for monitoring telecommunications traffic. The invention can be used to facilitate numerous enhanced telecommunications services. For purposes of illustration, however, the invention will be described principally in the context of facilitating account-balance based telecommunications services, such as prepaid calling. Further, the invention is useful both in landline and wireless communication networks.

2. Description of Related Art

For many years, the telecommunications industry has recognized the need to provide a mechanism for restricting or otherwise managing use of communication services based on a measure of subscriber account balance. In such systems, a subscriber (e.g., a corporation, an individual or another party) typically arranges with a service carrier to establish an account balance that typically represents a measure, such as time or dollar value, of telecommunications services that the subscriber is authorized to use. As the subscriber uses the services, the carrier may then continuously monitor and decrement the account balance. When the balance drops to a low threshold level, the carrier may notify the subscriber. And once the balance is exhausted, the carrier may refuse to provide additional services or may continue to provide service and then bill the subscriber for the excess use.

Traditionally, such "account balance" services have taken the form of "prepaid" service, where a subscriber deposits a prepayment amount with a service provider, and the service provider allows the subscriber to use services only up to the amount prepaid. When the subscriber approaches the prepaid limit during a call, the service provider might then prompt the subscriber to recharge or refill the account, and the subscriber may add to the account balance by making an additional prepayment, as for instance with a credit card.

Offered for years in both landline and wireless systems, prepaid service has been viewed largely as a tool to attract "credit challenged" consumers, that is, potential customers with poor credit histories or who otherwise lack adequate credit references. In addition, prepaid service appeals to consumers who do not want to be burdened with contracts and bills, who want to maintain fixed budgets, or who simply wish to remain anonymous. For example, travelers who require temporary phone service can benefit from prepaid service in the form of a prepaid calling card or a rented wireless phone that has been activated with prepaid minutes. Similarly, a calling card or pre-activated wireless phone with initial prepaid minutes can be given, sold or rented through various channels, including supermarkets and convenience stores.

The concept of account balance services, however, encompasses more than just traditional prepaid communications. In general, an account balance service can involve establishing or applying any type of account balance that serves as an actual or suggested limit on use of communications services. The account balance could represent a time limit such as minutes of use, or a financial limit such as dollars of use, for example. Further, the account balance that defines the actual or suggested limit on use need not necessarily come from a prepayment by a subscriber or other party. Rather, the account balance could simply represent an assigned limit on use, which the subscriber may or may not be allowed to exceed.

For example, a corporation may arrange with a telecommunications carrier to provide wireless communication service for its employees and may set up an account balance for each employee defining a maximum time or cost of use by the employee per month. The carrier may then bill the corporation for the use per employee up to the preset limit and may bill the corporation or employee for any excess use. As another example, parents may subscribe to an account balance service for a child in order to limit the child's use to a preset limit per month. At the end of each month, the carrier may then bill for the child's actual use, up to the preset limit.

In order to provide account balance service, a telecommunications network should include some mechanism to track the start and stop of calls, to monitor and adjust a subscriber's balance during a call, and to maintain control of the call in order to facilitate an appropriate response to a low or zero balance. Several methods currently exist to provide this functionality in today's intelligent telecommunications networks.

A general example of an advanced intelligent network ("AIN") is depicted in FIG. 1 and is designated generally by reference numeral 10. In this figure, circuit-switched pathways (i.e., trunks) that carry voice and data are represented by solid lines, and signaling pathways and other logical connections are represented by dotted lines.

In exemplary network 10, a first station 12 is connected to the public switched telephone network ("PSTN") 14 via a first service switching point ("SSP") 16, and a second station 18 is connected to PSTN 14 via a second SSP 20. Stations 12 and 18 may be telephones, fax machines, modems, or other such devices. SSPs 16 and 20 are connected to each other and to a centralized service control point ("SCP") 22 by a signaling network that includes a first and second signal transfer points ("STP") 24 and 26. This signaling network carries out-of-band signals that are used to control the switches and to set up and tear down the circuit between the calling party and called party. Currently, Signaling System 7 ("SS7") is the most commonly used signaling system.

SCP 22 contains control information and call processing logic to assist SSPs 16 and 20 in handling calls. For this purpose, SSP 16 is programmed with logic that defines "trigger points" at which SSP 16 should seek guidance from SCP 22. At these trigger points, SSP 16 sends a query message to SCP 22, and SCP 22 returns a response message to SSP 16. According to SS7, these query and response messages are known as Transaction Capabilities Application Part ("TCAP") messages.

For example, SSP 16 may include a table that identifies a range of subscriber numbers associated with special services, and SSP 16 may be programmed with a trigger that causes SSP 16 to query SCP 22 in response to a call origination or termination attempt involving one of those numbers. At that trigger point, SSP 16 would send a TCAP query to SCP 22, providing various parameters such as the calling number and the called number. In turn, SCP 22 would execute service logic to determine what SSP 16 should do with the call, and SCP 22 would then send a TCAP response back to SSP 16. The TCAP response may instruct SSP 16 to route the call to a particular destination or may provide various other instructions or information.

Alternatively, SSP 16 may itself be programmed with logic that indicates how to handle special service calls, without requiring SSP 16 to "dip" into the logic of SCP 22. For instance, in response to a call origination or termination attempt involving a particular number, SSP 16 may execute its own logic to determine what to do with the call. Internal tables and service logic programmed into SSP 16 may then instruct the SSP to route the call via a particular trunk group to a remote destination in the network.

On call origination, once an SSP receives routing instructions from SCP 22 or otherwise determines where in the network to route a call, the SSP may seek to set up a call with a switch serving the terminating location, by engaging in an SS7 signaling session. According to SS7, call setup and tear down between switches is accomplished by a series of messages in the Integrated Services Digital Network User Part ("ISUP") layer. These messages include the initial address message ("IAM"), the address complete message ("ACM"), the answer message ("ANM"), the release message ("REL") and the release complete message ("RLC"), among others. The ISUP protocol is defined by ITU-T recommendations Q.761 and Q.764, as well as Bellcore GR-317 CORE and GR-394 CORE, all of which are fully incorporated herein by reference.

To set up a call from station 12 to station 18, SSP 16 first sends an IAM message to SSP 20 via STPs 24 and 26. The IAM message indicates that the originating switch has seized an outgoing circuit, and provides address information (such as the dialed number) and other parameters related to routing and handling of the call. In response, SSP 20 sends an ACM message to SSP 16, to acknowledge that all address signals required for routing the call to the called party have been received and that the call can be connected to station 18. When station 18 goes off hook to answer the call, SSP 20 sends an ANM message back to SSP 16 to signal that station 18 has answered. In response, SSP 16 connects the call to SSP 20, thereby establishing an end-to-end communication path between station 12 and station 18.

To tear down a call between station 12 and station 18 (e.g., in response to an on-hook event at station 12, for instance), SSP 16 sends a REL message to SSP 20, indicating that the circuit identified in the message is being released for a specified reason and is ready to be put into an idle state upon receipt of a RLC message. SSP 20 then sends a RLC message to SSP 16, thereby putting the circuit into an idle condition.

In exemplary network 10, SCP 22 is for connected with a service management system ("SMS") 28 that allows for the provision and modification of the information and service logic residing in the SCP. SMS typically includes a user interface, the service creation environment ("SCE") 30, which may be accessed by a computer terminal 32. In this way, a user at terminal 32 is able to access, create and modify the service logic and other information in SMS 28 and then download it to SCP 22.

In addition, SSP 16 is connected to a service node ("SN") 34, which can provide voice and other interactions with users and can facilitate and perform various enhanced services for the switch. For this purpose, SN 34 may contain programmed service logic, which SN 34 may execute in response to messages received from SSP 16. In addition, SN 34 may contain an intelligent voice response unit ("IVRU") or other hardware and software to facilitate interaction with users, such as playing announcements, collecting dual-tone-multi-frequency ("DTMF") digits, and recognizing speech. As shown in FIG. 1, a service node such as SN 34 is typically connected to a switch. Consequently, the network may include many service nodes, each programmed to perform the same or similar services for its respective switch.

Finally, exemplary network 10 includes an intelligent peripheral ("IP") 36, to which SSP 16 and SCP 22 are connected, possibly through one or more STPs. Like SN 34, IP 36 can connect to an AIN call and can be arranged to provide assorted services, including tone generation, voice recognition, playback, compression, call control, recording, and DTMT detection and collection. IP 36 may similarly include an IVRU to facilitate various interaction with users. IP 36 can be connected to one or more SSPs and is designed to be application-independent, supporting generic services for more than one application. Unlike SN 34, IP 36 does not have call control logic embedded and must be instructed to perform each operation under the control of SCP 22 using a TCP/IP communication path to SCP 22 and the Bellcore defined SR-3511 ISCP-IP Interface Specification. This standard is fully incorporated herein by reference.

The exemplary network illustrated in FIG. 1 can be implemented in both landline and wireless systems. In the landline environment, the network is referred to as an advanced intelligent network ("AIN"). In the wireless environment, the network is referred to as a wireless intelligent network ("WIN"). The principal difference is that, in a landline system, station 12 is directly connected to SSP 16, whereas, in a wireless system, station 12 is a mobile station ("MS") that communicates via radio waves with a base station ("BS") and in turn with SSP 16 (referred to as a mobile switching center ("MSC")). In addition, other differences in operation exist between landline and wireless intelligent networks, due largely to differences in industry standards for the two environments. AIN standards are currently embodied in Bellcore's AIN Release 0.1 and AIN Release 0.2, while WIN standards are currently embodied in Telecommunications Industry Association ("TIA") interim standard IS-771 (which is based on other industry standards, including interim standard IS-41, now known as ANSI/TLA/EIA-41-D, for instance.) Each of these standards is fully incorporated herein by reference.

As indicated above, several systems exist for providing account balance functionality in an intelligent network. In one arrangement, when a switch receives an account balance call, the switch responsively routes the call through a specially programmed service node before routing the call to its destination. This arrangement thus inserts the service node in the voice path of the call, so that the service node is able to perform call timing, interject announcements, collect digits, and disconnect the call as necessary. FIG. 2 illustrates this "dedicated service node" scenario by way of example.

As shown in FIG. 2, SSP 16 is connected to SN 34 by a pair of voice trunks 38 and 40. When SSP 16 receives dialed digits from station 12, SSP 16 determines that the call is an account balance call, by consulting an internal translation table or by querying SCP 22. In response, rather than setting up a call directly with SSP 20, SSP 16 routes the call over voice trunk 38 to SN 34, together with address information including the calling number and dialed number. Upon receipt of the call, service node 26 communicates with a customer information system (not shown) or other database to determine the caller's account balance. If the account balance is a minimum necessary to support a call from station 12 to station 16, then SN 34 routes the call via trunk 40 to SSP 16 with instructions for SSP 16 to route the call to its destination. In turn, SSP 16 sets up and connects the call from to SSP 20 and ultimately to station 18.

With this arrangement, a "hairpin" or physical trunk path is established from station 12, through SSP 16, through SN 34, back to SSP 16, through PSTN 14 and SSP 20, and finally to station 18. This trunk path is depicted by the bold line 42 in FIG. 2. Because SN 34 sits in this trunk path, SN 34 can readily monitor the start and stop of the call, interject announcements, and take the call back (e.g., cut off the call) if desired. Thus, for instance, if the caller's account balance drops to a low threshold level during the call, SN 34 may break into the call and play a low-balance announcement along trunk 40 to station 12. SN 34 may then allow the caller to recharge the account balance, by making a credit card payment through DTMF tones for instance, and SN 34 may forward the renewed balance information to the account balance database and allow the call to continue.

Further, if the caller's account balance reaches zero, the programmed service logic in SN 34 may dictate that the call should be disconnected. In that case, SN 34 may play an announcement or tone indicating a zero balance and may then release the connection with station 18 along voice trunk 38, thereby disconnecting the call. If desired, service node 26 may then remain connected to station 12 until the caller hangs up, to allow the caller to recharge the account.

The dedicated service node arrangement shown in FIG. 2 is presently the most common mechanism for prepaid calling services. The arrangement requires very little if any special intelligence to be programmed into the switches or SCP. However, the arrangement suffers from at least two significant limitations. First and foremost, the arrangement monopolizes two voice trunks between SSP 16 and SN 34, solely to keep SN 34 within the voice path. Voice trunks serving SSP 16 are an expensive and limited resource. Therefore, this method is not desirable. Second, because a service node such as SN 34 is typically connected to a particular switching point such as SSP 16, a carrier may have to program the same functionality into many service nodes throughout its network in order to offer prepaid functionality to users throughout the network. Unfortunately, however, implementing or updating this duplicate functionality is both time consuming and expensive.

In another arrangement, the responsibility for managing and tracking account balance calls is migrated in part to SCP 22, by placing the SCP in a so-called ISUP "looparound" signaling path with SSP 16. In this method, SSP 16 is programmed with logic authorizing SSP 16 to route calls to SCP 22 as though SCP 22 were a switch (while, in fact, the SCP is usually incapable of actually receiving calls). Rather than seeking to route such calls along a normal trunk connecting SSP 16 and SCP 22, however, SSP 16 is programmed to route such calls along a special "looparound trunk" (the "outbound looparound trunk") at SSP 16 which has been tied together with another trunk (the "inbound looparound trunk") at SSP 16. Thus, when SSP 16 receives a prepaid call to or from station 12, SSP 16 seeks to set up the call to SCP 22 along the outbound looparound trunk by sending an initial IAM message to SCP 22. In response, SCP 22 surreptitiously returns an IAM message to SSP 16 purporting to set up the same call along the inbound looparound trunk. Upon completion of call setup, the net result is that SSP 16 ends up routing the call to itself, from the outbound looparound trunk to the inbound looparound trunk, and then to a destination, while leaving a signaling path for the call through SCP 22. Consequently, because SCP 22 sits in the signaling path of the call, it can time the call, track the subscriber's account balance, and release the call when the balance is depleted.

FIG. 3 illustrates this looparound arrangement in greater detail. Referring to FIG. 3, SSP 16 is coupled to a plurality of trunks for establishing circuit switched communications with other locations in network 10. A pair of these trunks 44, 46 are tied together at SSP 16 for establishing looparound with respect to SCP 22. Although FIG. 3 shows only one pair of such looparound trunks, SSP 16 would include a number of looparound pairs sufficient to serve an expected number of prepaid customers.

To facilitate looparound, SCP 22 is modified to include ISUP messaging capability, including the ability to receive and parse ISUP messages (such as IAM messages) and to create and send ISUP messages. In addition, SCP 22 is coupled by a SR-3511 signaling path to an IVRU 52, which may be part of a service node or intelligent peripheral platform, and IVRU 52 is coupled by a voice trunk to PSTN 14.

When SSP 16 receives a prepaid call request from station 12, SSP 16 consults its internal translation table and service logic, which dictates that the account balance call should be routed via outbound looparound trunk 44 to SCP 22. SSP 16 then seeks to set up the call by sending a first IAM message ($IAM_1$) to SCP 22 requesting a call connection via outbound looparound trunk 44. Upon receipt of $IAM_1$, SCP 22 does not immediately respond with an ACM message. Instead, SCP 22 directs SSP 16 to connect the call to IVRU 52 so that IVRU 52 can announce the subscriber's balance. To do so, SCP 22 queries IVRU 52 to identify an available trunk at the IVRU, and SCP 22 then sends a second IAM message ($IAM_2$) to SSP 16, instructing SSP 16 to receive a call on inbound looparound trunk 46 and to route it to IVRU 52 via trunk 48. SSP 16 then responds to $IAM_2$ by sending an ACM message ($ACM_2$) to SCP 16, and SCP 22 then responds to $IAM_1$ by sending an ACM message ($ACM_1$) to SSP 16.

Next, SSP 16 sets up and connects the call to IVRU 52 via trunk 48 and PSTN 14. In turn, IVRU 52 sends an ANM message ($ANM_A$) back to SSP 16, SSP 16 forwards $ANM_A$ via to SCP 22, and SCP 22 forwards $ANM_A$ to SSP 16. The result of this signaling is to establish a looparound circuit 54 as shown in FIG. 3, with an ISUP signaling path extending through SCP 22 and the associated voice path coupling trunks 44, 46 at SSP 16, thereby connecting station 12 with IVRU 52. With this connection established, IVRU 52 plays an announcement to the subscriber, indicating the available account balance. IVRU 52 then releases the call leg of trunk 48, by sending a REL message ($REL_A$) to SSP 16. In response, SSP 16 forwards the $REL_A$ back to SCP 22 which responds to SSP 16 with a RLC message. SCP 22 does not release back to SSP 16 however, but then sends a third IAM message ($IAM_3$) to SSP 16 to interconnect trunks 46 and 50 and set up a call with the final destination switch, SSP 20. Thus, SCP 22 sends the third IAM message to remote SSP 20 requesting connection over trunk 50, and SSP 20 sends an ACM message ($ACM_3$) back to SSP 16 which is forwarded by SSP 16 to SCP 22.

When station 18 answers, SSP 20 sends an ANM message ($ANM_B$) to SSP 16, and SSP 16 forwards $ANM_B$ to SCP 22 thereby closing the signaling and voice paths between stations 12 and 18. Finally, when the call terminates (from station 12), a REL message ($REL_B$) will pass from SSP 16 to SCP 22. SCP 22 will then send a RLC message back to SSP 16 and a REL to SSP 20 which will pass a RLC message back to SCP 22 terminating both legs of the looparound trunk 46.

With this arrangement, the signaling path remains through SCP 22 throughout the duration of the call, while the actual call path is defined by looparound circuit 54. Because SCP 22 sees the ISUP messages concerning the status of the call (e.g., ANM and REL messages), SCP 22 can keep track of the start and stop of the call, recording these events in a call context (i.e., call status) register. Consequently, SCP 22 can time the call and accordingly decrement the subscriber's account balance. Further, SCP 22 can monitor the subscriber's balance as the call proceeds and can readily disconnect the call in response to a depleted balance by sending a REL message to SSP 16.

Although this SCP-looparound arrangement facilitates prepaid functionality, it suffers from a significant limitation: namely, it restricts prepaid customers to a predefined set of calling numbers that are associated with prepaid service. This predefined set of numbers has to be programmed into the switch so that the switch can appropriately recognize prepaid calls and then route such calls via the looparound trunk.

Restricting subscribers to a predetermined set of numbers for prepaid service is problematic from several perspectives. First, it forces the service provider to dedicate a set of numbers to prepaid service and to program every switch in the network with the set of numbers. This therefore assumes that the service provider can determine accurately how many numbers to dedicate for such service at the start, and the service provider risks reserving too many or too few numbers for this purpose. Further, limiting subscribers to a dedicated set of numbers could present difficulty in terms of attracting new customers, since this restriction may force new customers to change their phone numbers (to a "prepaid phone number") in order to acquire the service. For customers with personalized or "vanity" numbers, this is particularly troubling.

Still another arrangement for providing account balance service has been recently proposed within the international standards committee that is responsible for wireless communications standards, TIA Standard Committee TR-45. In particular, in an effort to facilitate seamless roaming among competitive WIN networks, the TIA has published a draft recommendation for "prepaid-charging" enhancements to IS-771, which is set forth in "UWC Pre-Paid Charging Stage 2" ("PPC-2"), TR45.2.2.4 (January 19, 1999). According to PPC-2, prepaid service can be facilitated by implementing a variety of new WIN triggers and operations in network entities. Chief among these new triggers and operations are the following:

Initial_Origination and Initial_Termination triggers, which the MSC can use to invoke prepaid service logic for calls originated from or terminated to a prepaid subscriber.

Calling_Routing Address_Available and Called_ Routing_Address_Available triggers, which the MSC can use to convey routing address and call type information for prepaid calls to service logic.

O_Answer, T_Answer, O_Suspend, O_Disconnect and T_Disconnect triggers, which the MSC can use to notify service logic of a call answer or disconnect for calls originating from or terminating to a prepaid subscriber.

(See PPC-2, at pages 1–4.) As proposed, these triggers would be programmed into each MSC in a WIN-compliant network and would enable the MSC to interact with a WIN SCP and an IP, so as to facilitate prepaid functionality.

Referring again to the exemplary network shown in FIG. 1, the proposed PPC-2 standard would operate as follows, where the prepaid subscriber originates a call from station 12 (which may be mobile station MS 12) by sending dialed digits to SSP 16 (which may be mobile switching center MSC 16). (See Section 8.X.2 of PPC-2). Upon receipt of the dialed digits, MSC 16 sends an IS-771 origination request message (ORREQ) to SCP 22, providing parameters such as the mobile station ID and the dialed digits. In response, SCP 22 determines that intelligent peripheral IP 36 needs to play an announcement of the subscriber's available balance. Therefore, SCP 22 sends an IS-771 seize resource message (SEIZRES) to IP 36, requesting a routing number for routing a call from MSC 16 to IP 36. IP 36 responds by allocating a temporary location directory number ("TLDN") to a port at IP 36 and returning the TLDN as a parameter in a response message to SCP 22. SCP 22 then sends an IS-771 connect-to-resource message (CONNRES) to MSC 16, instructing SSP 16 to set up a call to the allocated TLDN at the IP, and MSC 16 sets up the call.

Once the call is set up between MSC 16 and IP 36, IP 36 asks SCP 22 for instructions, and SCP 22 instructs IP 36 to play a balance-announcement. IP 36 then plays the balance-announcement to the user at MS 12 and tells SCP 22 it has done so. In turn, SCP 22 sends a closing message (anlyzd) to MSC 16, and MSC 16 disconnects the call from IP 36.

According to the recommendation, MSC 16 next sets up a call to the number dialed by the originating subscriber and, when the called party answers, MSC 16 detects the O_Answer trigger and responsively sends an O_ANSWER message to SCP 22. Upon receipt of the O_ANSWER message, SCP 22 begins decrementing the subscriber's account balance. In turn, when MS 12 ends the call, MSC 16 detects the O_Disconnect trigger and responsively sends an O_DISCONNECT message to SCP 22. Upon receipt of the O_DISCONNECT message, SCP 22 stops decrementing the subscriber's account balance.

The method proposed by PPC-2 would appear to readily facilitate prepaid functionality in wireless communications. However, the proposed method suffers from a very significant limitation: to ensure seamless operation, the method would require all of the switches in the WIN-compliant network to be programmed with the new PPC-2 capability set, including the new triggers and operations listed above. Unfortunately, upgrading all of the existing MSCs in a WIN network to become compliant with PPC-2 would be very expensive and time consuming. In fact, it is anticipated that the industry will not be ready to begin widely implementing PPC-2 for at least several years. Furthermore, as is conventional in industry standards, the PPC-2 recommendation defines new functions but leaves specific implementation decisions to the industry. Therefore, actual implementation of the proposed standard will be subject to interpretation by competing manufacturers and carriers, which could result in interoperability problems.

In view of the deficiencies in the art, there remains a need for an improved system for providing account balance service.

SUMMARY OF THE INVENTION

The present invention provides a method and system for monitoring telecommunications traffic. As indicated above, the invention may be usefully employed to offer a variety of special services. One of these services is account balance calling, and the invention will be described mainly in that context.

Generally speaking, an exemplary embodiment of the invention operates as follows. When a switch (such as an MSC) receives an originating or terminating call request for a subscriber (e.g., a particular station or customer) signed up for a special service such as account balance calling, the switch sends a request message to a service controller such as an SCP. The switch may do so in response to an all-digits trigger, for instance. When the SCP receives the request message, it consults a service profile table and determines that the call is a predefined type of call, namely a call to be treated according to the special service. Therefore, the SCP sends a response message to the switch with a service-code indicative of the special service, together with a destination address to which the call should be routed. For instance, if the service code for account balance calling is *65 and the destination address is 988-765-4433, the SCP might send as the destination address *65-988-765-4433. The destination address may be the network address of a designated network element, such as an IP (or the SCP itself) for instance.

In response to the service code, the switch determines by reference to a conventional translation table for instance, that the call should be routed via an outbound looparound trunk to the destination IP address specified by the SCP. Therefore, the switch sends an IAM message to set up the call with the IP on that trunk. When the IP receives the iAM message, it may consult the SCP to receive instructions for proceeding and, in the case of an account balance call, to learn the available account balance. The IP then sends its own IAM message back to the switch, to complete a looparound circuit at the switch and to cause the switch to route the call to particular destination. The particular destination may, for instance, be the IP itself. In that case, for an account balance call for instance, the IP might play an announcement to the subscriber indicating the available balance, and the IP could then release the last call leg and send an IAM message to the switch directing the switch to route the call to the called party.

As the call begins and ends, the IP will be privy to the ISUP setup and teardown messages for the call. When the IP sees these messages, it may advise the SCP, and the SCP may take any appropriate action. For an account balance call, for instance, the SCP may time the call based on these messages and decrement the account balance accordingly. Further, the SCP may interact with an external call calculation engine, which may maintain or have access to account balance information. When the balance becomes too low, the SCP may then instruct the IP to take the call back, such as by sending a REL message to the switch, and to play an announcement or collect digits or additional prepayment.

The present invention enables a telecommunications carrier to provide special services that require special routing (such as via a looparound trunk) broadly to any telephone number, without the need for subscribers to dial feature codes to trigger the service, and without the need to program switches with extensive new functionality and message sets. By having the SCP identify the call as a predefined type of call and then provide the switch with a service code for that type of call, the switch can be made to route the call via a looparound trunk, regardless of the subscriber's number. Thus, with the present invention, a telecommunications carrier, agent or subscriber can readily apply account balance service to a subscriber account by simply setting up an account balance and updating the service profile for the account.

Accordingly, the present invention lends itself to new and improved provisioning methods and service offerings. For instance, it may be possible to open up a service profile database (e.g., through an SMS) to modifications by subscribers, customer service agents, retail sales agents or the like. A web-based interface over the Internet or other network, for example, may allow a subscriber to add or modify a special service for his or her account. For example, through a web-based interface, a subscriber may be allowed to call up his or her service profile (e.g., for a landline station and/or mobile station) and add account balance service by making a prepayment or by otherwise specifying an actual or suggested limit on use. As another example, a retail outlet selling or renting mobile stations may readily call up the service profiles for the mobile stations and set up account balance service for the stations, with prepayment by the customer. Other examples exist as well.

These as well as other advantages of the present invention will become apparent to those of ordinary skill in the art by reading the following detailed description, with appropriate reference to the accompanying drawings.

BRIEF DESCRIPTION OF THE DRAWINGS

A preferred embodiment of the present invention is described herein with reference to the drawings, in which:

FIG. 9 is a flow chart illustrating a process flow in accordance with an exemplary embodiment of the present invention.

DETAILED DESCRIPTION OF AN EXEMPLARY EMBODIMENT

Figure 1:
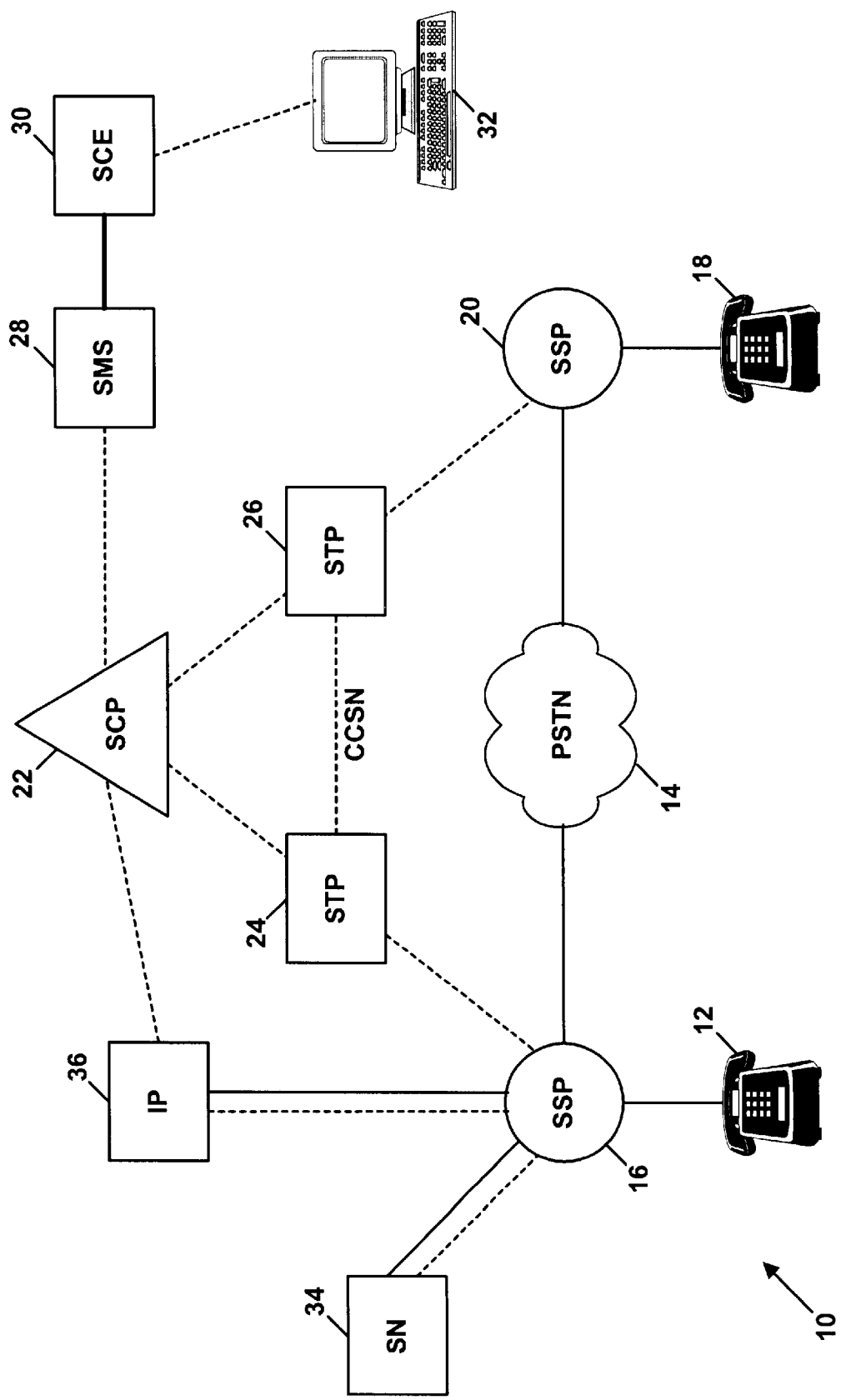
FIG. 1 is block diagram of a telecommunications network in which the present invention may be employed.
Figure 2:
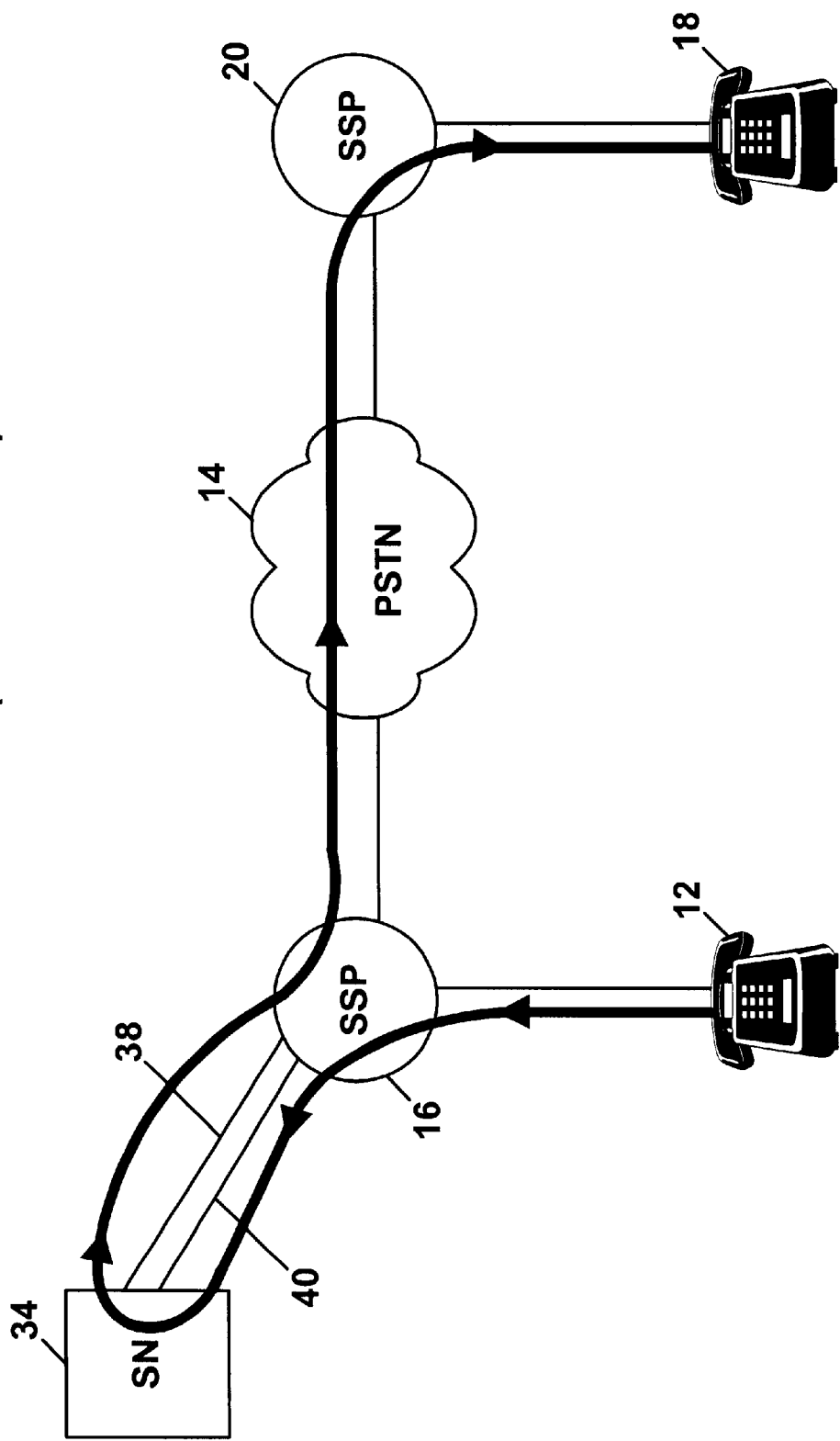
FIG. 2 is an illustration of a prior art dedicated service node arrangement for prepaid calling.
Figure 3:
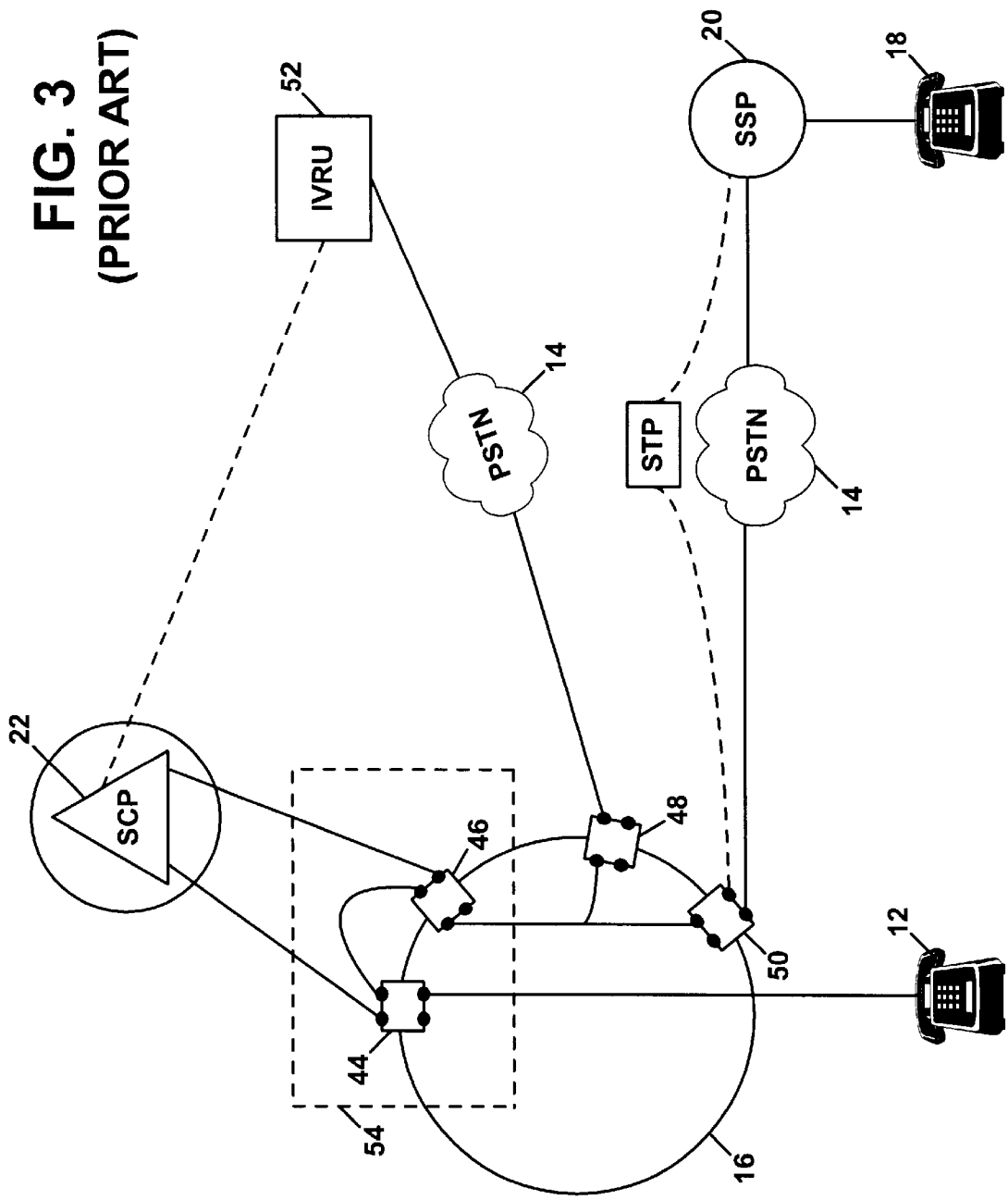
FIG. 3 is an illustration of a prior art SCP-looparound arrangement for prepaid calling.
Figure 4:
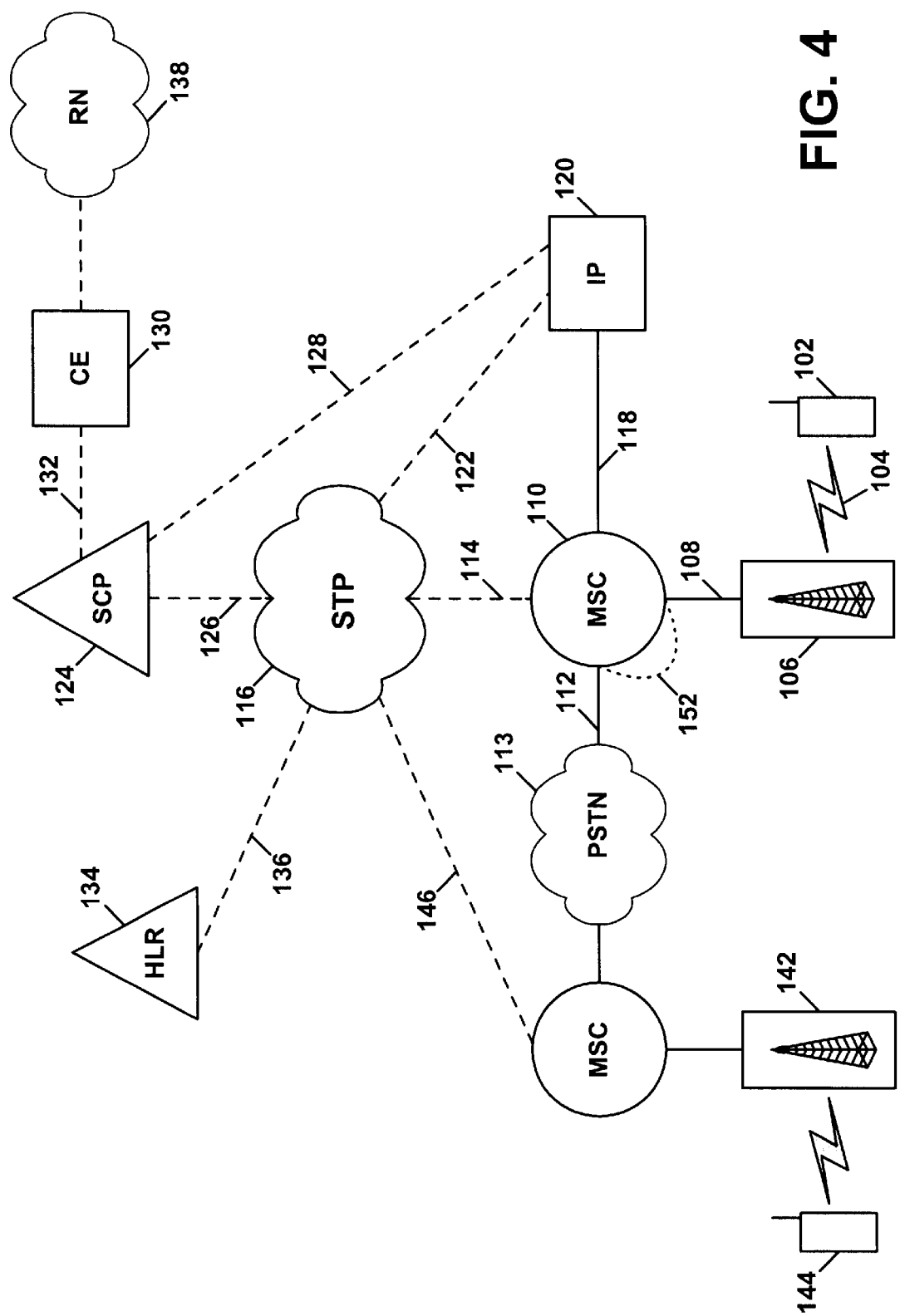
FIG. 4 is a block diagram of a telecommunications network in which the present invention may be employed.

As indicated above, the present invention will be described as a method and system for providing account balance services. Referring to the drawings, FIG. 4 illustrates a wireless telecommunications network 100 in which account balance ("AB") services may be provided according to an exemplary embodiment of the invention. This and other arrangements described herein are shown for purposes of illustration only, and those skilled in the art will appreciate that other arrangements and other elements (e.g., machines, interfaces, etc.) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location.

As shown in FIG. 4, network 100 includes a mobile station ("MS") 102, which communicates over an air interface 104 (e.g., a $U_m$ interface as defined by IS-95) with a base station controller ("BSC") 106. An intermediate base station (not shown) may be interposed between MS 102 and BSC 106. MS 102 may be any mobile station such as a cellular telephone, a personal data assistant ("PDA"), a computer, a fax machine or other such device. In the example illustrated, MS 102 is a Code Division Multiple Access ("CDMA") telephone supporting IS-95, IS-41 and GSM Intersystem Operation Standards ("IOS"). BSC 106 may in turn be any base station controller arranged to communicate with MS 102, such as the Autoplex controller manufactured by Lucent Technologies.

BSC 106 is in turn coupled by a standard IS-634 interface with a mobile switching center ("MSC") 110, which serves to connect calls between various points in network 100. As shown, for instance, MSC 110 is interconnected by a voice/data link 112 to PSTN 113, which provides a path through which MSC 110 may connect calls with a remote MSC 140 and in turn with a remote station 144. In addition, MSC 110 is interconnected by a voice/data link 118 to a service node or intelligent peripheral ("IP") 120, which, as described above, can be arranged to provide assorted special services such as playing announcements and collecting digits. IP 120 may include a processor and an account balance logic module (e.g., software) executed by the processor to perform various functions as described herein. Of course, MSC 110 may provide connectivity to other nodes in network 100 as well.

Exemplary network 100 includes a signaling subsystem or signaling sub-network, which may be a packet-switched SS7 signaling system for instance. At the core of this signaling system is an STP backbone network 116, which may consist of one or more STPs and associated signaling paths. STP network 116 routes signaling messages, such as IS-41 MAP and ISUP messages, between various entities in network 100. In the arrangement shown, for instance, MSC 110 is coupled to the STP network by a signaling path 114, and IP 120 is coupled to the STP network by a signaling path 122, thereby facilitating signaling communications between MSC 110 and IP 120 through one or more STPs. Similarly, remote MSC 140 is further coupled to STP network 116 by signaling path 146, thereby facilitating signaling communications between MSC 110 and MSC 140.

To facilitate IN services, network 100 includes a WIN SCP 124, which is coupled by a signaling path 126 with the STP network. SCP 124 may be a Telcordia SCP, which can be programmed by means known to those skilled in the art. SCP 124 thus serves conventional features such as providing routing instructions to MSC 110. SCP 124 is typically owned and operated by a local or long distance carrier. In the exemplary embodiment, SCP 24 is coupled by a link 128 with IP 120. Link 128 may be a wide area network such as the Internet, and SCP 124 and IP 120 may communicate over this link by a TCP/IP interface such as Bellcore's ISCP-IP Interface Specification, Version 5.0, Special Report SR-3511, Issue January 2, 1997 ("SR-3511"), which is fully incorporated herein by reference.

A Home Location Register ("HLR") 134 is conventionally coupled by a signaling path 136 with STP network 116. HLR 134 serves standard functions in the wireless network such as managing service profiles and authentication information for subscribers and mobile stations. HLR 134 is typically located on an SCP operated by the home service provider of record for a given subscriber. In addition, network 100 typically includes a Visitor Location Register ("VLR"), which stores service profile information for mobile stations currently being served the carrier operating SCP 124. The VLR may be maintained on the MSC, on the SCP, or at another suitable location.

To manage account balances, network 100 further includes a calculation engine ("CE") 130. Calculation engine 130 is a programmed computer running an application to manage subscriber account balances. In the arrangement shown, calculation engine 130 is coupled to SCP 124 by a link 132. Link 132 may be a wide area network such as the Internet, and SCP 124 and calculation engine 130 may communicate over the link by a TCP/IP interface such as Bellcore's ISCP Generic Data Interface Specification for TCP/IP, Version 5.0, Special Report SR-3389, Issue 2, January 1997 ("SR-3389"), which is fully incorporated herein by reference. Although calculation engine 130 is shown as a separate entity coupled with SCP 124, the functions of calculation engine 130 may instead be programmed into SCP 124 or facilitated by one or more other entities in the network.

Figure 5:
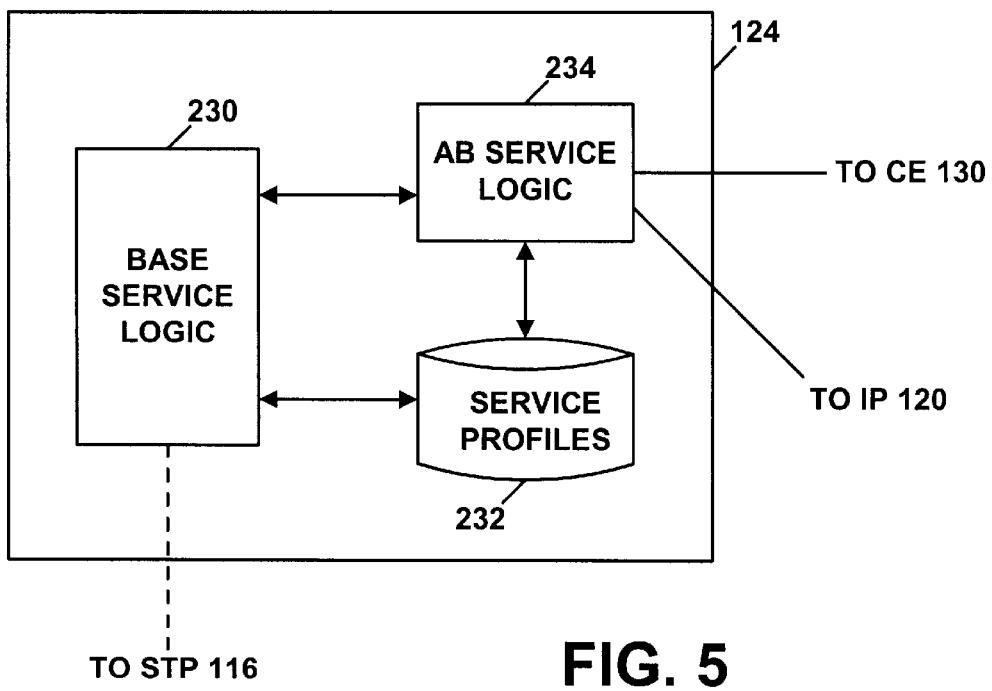
FIG. 5 is a block diagram of an SCP that may be employed in an exemplary embodiment of the present invention.

An exemplary SCP 124 is shown in greater detail in FIG. 5. Referring to FIG. 5, double-headed arrows indicate some of the logical connections between the components. SCP 124 typically includes a number of logic modules, which may be stored in a memory (not shown) and executed by a processor (not shown). Exemplary SCP 124 includes a base service logic module 230. Base service logic module 230 includes functionality for decoding and encoding TCAP messages received from and sent to MSC 110 via STP network 116. Base service logic module 230 also includes service logic for determining what databases and service logic modules to invoke to process the information from the decoded TCAP messages. For example, base service logic module 230 has access to a customer service profile database 232, which contains the service profiles of mobile stations currently being served. Each mobile station may have a service profile that identifies (1) the mobile station by identification number ("MSID") or other indicia, (2) what IN services the mobile station subscribes to (e.g., call forwarding, abbreviated dialing, account balance, etc.), and (3) what service logic module to run for each service.

The service profile may also include certain service parameters specifying the operation of one or more of the services to which the mobile station subscribes. For example, the service profile for MS 102 might list its MSID and indicate that the station subscribes to an account balance service. The service parameters for this service may include an indication of whether MS 102 will accept incoming account balance calls (i.e., incoming calls that would be charged against the account balance for MS 102 rather than the caller), an indication that only certain calling numbers can get through, or other such information.

Typically, associated with each IN service is a service logic module, which is the software specifying how to provide the service. Each service logic module is typically able to query service profile database 232 directly and to query base service logic 230 as well. To provide a given IN service, base service logic module 230 typically invokes the appropriate service logic module as a kind of subroutine call. In particular, base service logic module 230 passes a set of input parameters to the service logic module, and the module returns a set of output parameters out of which base service logic module 230 can encode the TCAP message or messages needed to provide the desired service.

In an exemplary embodiment of the present invention, SCP 124 includes an AB service logic module 234. AB service logic module 234 communicates via link 132 with AB calculation engine 130 in order to facilitate tracking of the account balance available to MS 102. In addition, AB service logic module 234 communicates via link 128 with IP 120 in order to carry out various functions associated with AB service. By way of example, if the calculation engine (or, alternatively, the logic module 234) determines that the account balance available to MS 102 is below a particular threshold, the conclusion may be that the call should not be completed unless the subscriber replenishes the account. In that event, logic module 234 may specify how to connect the mobile station to IP 120 so that IP 120 can play a prerecorded low-balance message and prompt the subscriber to add to the balance. Logic module 234 would pass these routing instructions to base logic module 230, which would then provide the routing instructions to MSC 110 in a TCAP response message. This and other functions of the AB service logic module 234 will be described more below.

Figure 6:
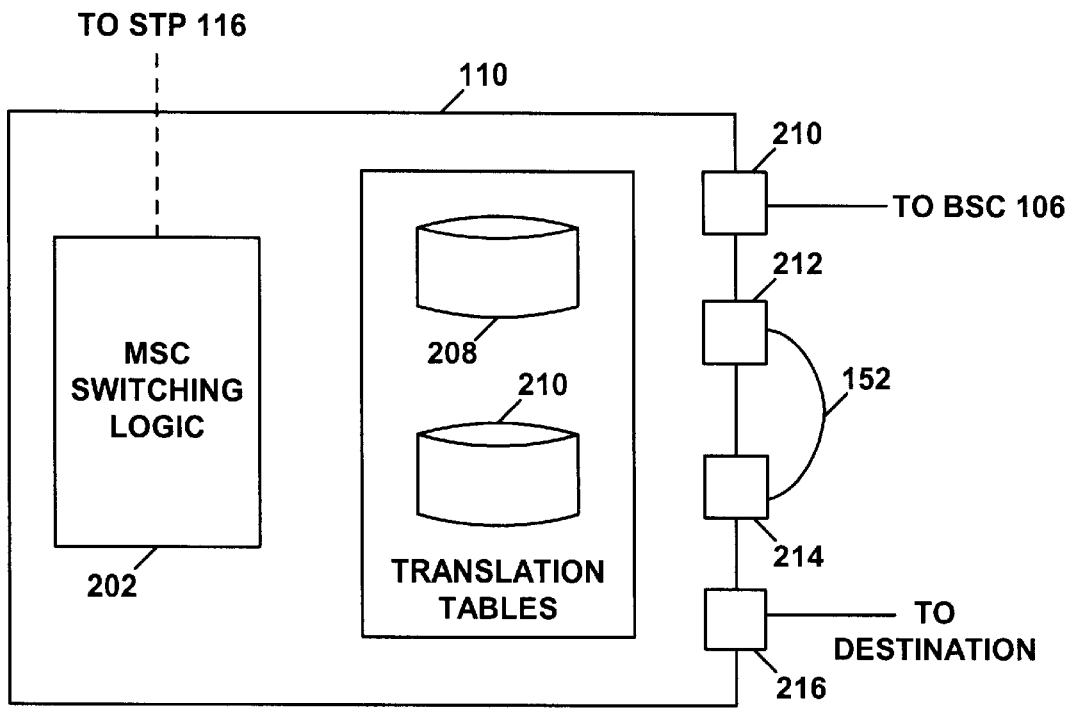
FIG. 6 is a block diagram of an MSC that may be employed in an exemplary embodiment of the present invention.

Referring now to FIG. 6, an exemplary mobile switching center 110 is illustrated in greater detail. MSC 110 includes a switching logic module 202, which may be stored in memory (not shown) and executed by a processor (not shown). Switching logic module 202 is software specifying how MSC 110 should handle call requests. In the exemplary embodiment, MSC 110 is compliant with current WIN standards and need not (but may) provide for the new triggers and operations contemplated by PPC-2 (such as the O_Answer and O_Disconect triggers discussed above). Therefore, switching logic module 202 typically includes at least basic WIN triggers and messaging capabilities. For instance, the switching logic preferably includes an "all-digits" trigger, which causes MSC 110 to send an SS7 TCAP query message to SCP 124 in response to any originating or terminating call attempt.

In the exemplary embodiment, MSC 110 includes a number of ports through which MSC 110 may establish circuit-switched communications with other nodes in network 100. Each port may define a physical connection with a trunk extending to another node in the network or may define a channel for communicating over such a trunk. For example, a standard T1 line between MSC 110 and the PSTN includes 24 voice-grade channels and therefore defines 24 ports or trunks at MSC 110. For illustration, FIG. 6 depicts four ports 210, 212, 214 and 216. MSC 110 is arranged to interconnect incoming and outgoing calls by coupling together two or more of its ports. For instance, if MSC 110 receives a call from mobile station 102 on port 210, MSC 110 may route the call through port 150 to remote MSC 140. These port connections may be physical connections but are more likely to be virtual connections in which programmed logic forwards a call signal from one port to another.

When MSC 110 is asked to connect a call to a particular destination in network 100, typically the only information about the destination that is provided to MSC 110 is a dialed number or other network address of the destination. (In wireless communications, this network address is typically a temporary local directory number ("TLDN"), which a serving MSC assigns to a roaming subscriber.) In order to set up and route the call to that destination address, MSC 110 must be able to identify an outbound trunk group that can establish a circuit with the serving MSC. Therefore, MSC 110 needs some way to correlate the destination address with an appropriate trunk group.

In landline AIN systems, this translation can be handled through a query to an SCP, in response to which the SCP can return a trunk group ID to the querying switch. Under current wireless standards, however, this is not possible; the standards provide no way for a WIN SCP to instruct an MSC which trunk group to use for a given call. Therefore, in order for an MSC to select a trunk group over which a call can be routed to a given destination address, the MSC must usually access a local (e.g., internal) translation table (or other logic) that correlates destination addresses with trunk groups. Referring to FIG. 6, MSC 110 includes such a translation table 208.

In addition, in order to facilitate various special services, most MSCs can be programmed to recognize service codes that represent service requests and to take a designated action in response. Service codes can take any form but often comprise an asterisk followed by a sequence of digits. For example, the service code *911 may represent a request for emergency service, while the service code *123 may represent a request for travel assistance. In some cases, the service code may have special meaning when read in connection with appended digits. For instance, the service code *87 may represent a request to change a call-forwarding number to the number dialed after the code. Thus, in response to the dialed digits *87-989-976-5432 from mobile station 102, MSC 110 might set a database record for station 102 to indicate that all incoming calls should be redirected to the number 989-976-5432.

Figure 7:
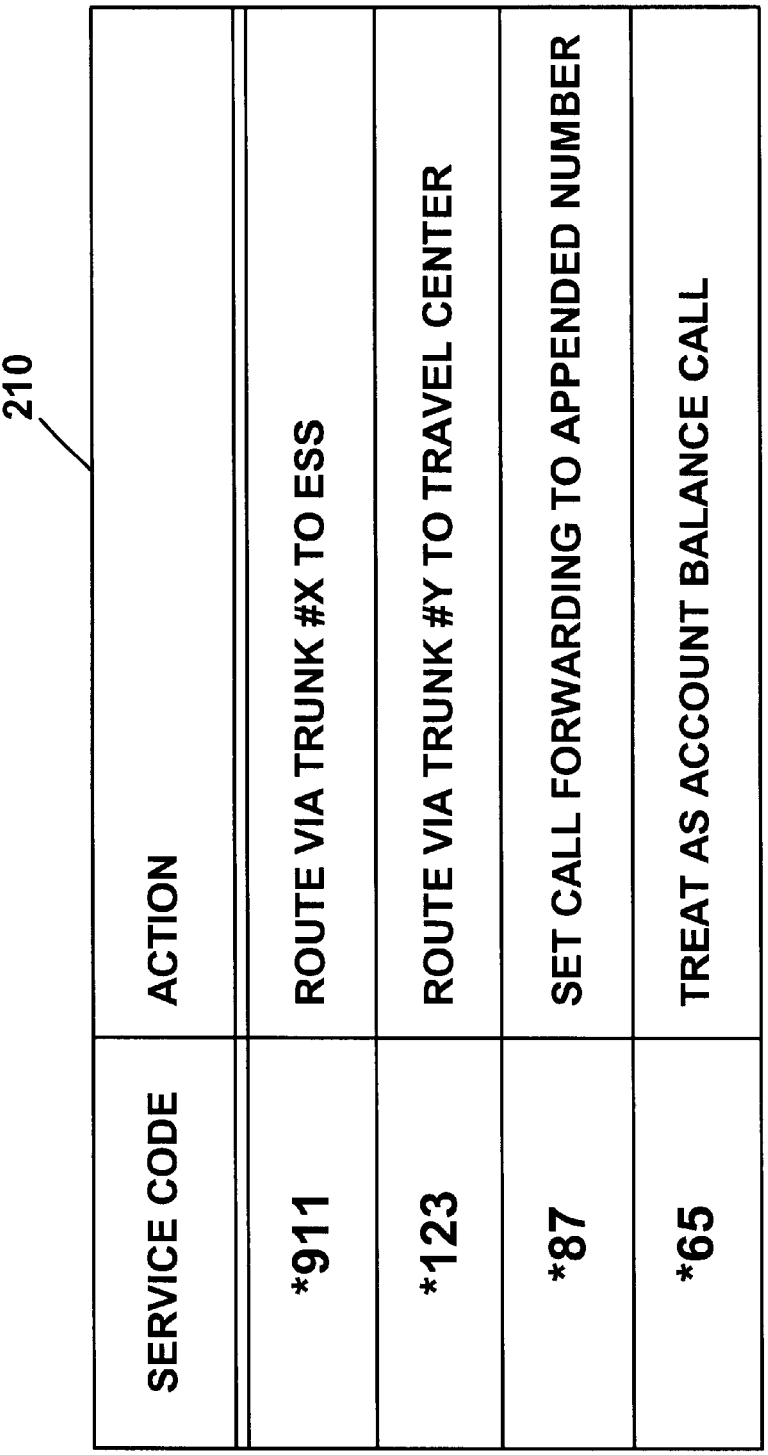
FIG. 7 is an exemplary translation table for translating service-codes to call treatments.

To trigger the designated action in response to a service code, MSC 110 typically includes a translation table (or other logic) that correlates service codes with specified treatments or actions. FIG. 7 illustrates one such table 210 by way of example. As shown in FIG. 7, table 210 lists service codes *911, *123 and *87 as described above. In addition, in the exemplary embodiment, MSC 110 is programmed with an account balance service code, shown for purposes of illustration only as *65. Thus, for instance, in response to the dialed digits *65-555-677-1494, switching logic module 202 in MSC 110 may determine by reference to table 210 that the call is an account balance call and may treat the call accordingly.

MSC 110 includes one or more pair of ports that are reserved for establishing looparound circuits in accordance with an exemplary embodiment of the present invention. As shown in FIG. 6, for instance, a pair of ports 212 and 214 are reserved to establish a looparound circuit 152. Looparound circuit 152 is established by virtually or physically connecting the two ports together so that a call routed "out" one port "re-enters" at the other port. Although the actual connection between these ports may be only a virtual connection (i.e., no physical trunk connecting the ports), the ports may be nevertheless be considered to connect an outbound looparound trunk (i.e., the outbound side of the circuit) with an inbound looparound trunk (i.e., the inbound side of the circuit). The number of ports reserved in MSC 110 for establishing looparound circuits is an engineering decision, which may be based on a statistical estimate of the number of calls that MSC 110 may need to route via a looparound circuit at any given time.

Figure 8:
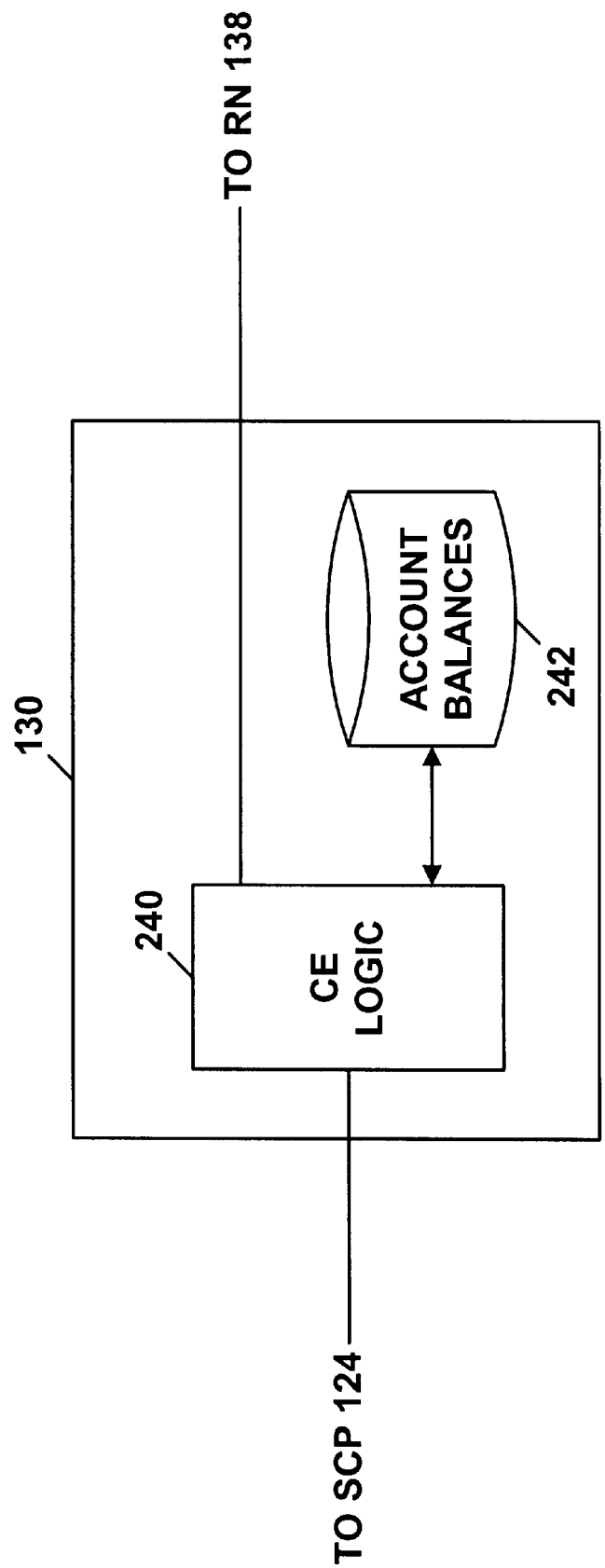
FIG. 8 is a block diagram of an calculation engine that may be employed in an exemplary embodiment of the present invention.

Referring next to FIG. 8, an exemplary calculation engine 130 is shown in greater detail. As indicated above, calculation engine 130 may be a programmed computer, operating a set of machine language instructions to perform various functions. As shown in FIG. 8, exemplary calculation engine 130 includes a calculation engine logic module ("CE logic module") 240 and an account balance database 242. In an alternative embodiment, account balance database 242 may instead be located in another entity in network 100, such as a customer information system. In that case, calculation engine 130 could access the account balance information through a wide area network such as the Internet, for instance.

One of the main purposes of calculation engine 130 is to keep track of account balances. As described above, an account balance may take any form but typically serves as an actual or suggested limit on use of communication services. In the exemplary embodiment, the account balance for a given mobile station or customer account may be a number of minutes of use, which may be initially established through any desired means. As examples presently contemplated, for instance, the balance may arise from (i) a credit card or cash payment (e.g., a number of minutes per dollar), (ii) accumulated airline frequent flyer miles (e.g., a number of minutes per a certain number of miles), (iii) awards for consumer purchases (e.g., a number of minutes per a certain quantity or dollar value of groceries, meals, utilities or other items purchased, rented or used), (iv) awards for listening to advertisements before having calls connected, and (v) an assigned limit (e.g., a corporate limit on minutes of use per employee, or a parental limit on minutes of use per child).

Calculation engine 130 may be programmed to perform any functions desired for tracking and maintaining account balances. In the exemplary embodiment, for instance, CE logic module 240 may be invoked by AB service logic module 234 in SCP 124 in response to an account balance call attempt. CE logic module 240 may be arranged to check account balance database 242 to ensure that a sufficient balance exists to support the call (e.g., to support an average length call of say 5 minutes for instance) and to notify SCP 124 accordingly. Further, CE logic module 240 may be arranged to write new balance information to the account balance database 242 throughout a call, at the end of a call, or when otherwise instructed.

CE logic module 240 may be arranged to provide AB service logic module 234 in SCP 124 with an indication of the available balance for a given call. AB service logic module 234 may then time the call and, upon completion of the call, notify CE logic module 240 of the change in balance or the new balance. CE logic module 240 may then decrement the balance in database 242. Alternatively, CE logic module 240 may be arranged to read an account balance at the start of a call, and to then decrement the account balance throughout the call and notify SCP 124 when the account balance reaches a low threshold level. Of course, other examples exist as well.

In addition, referring to FIG. 4, calculation engine 130 may be coupled with a replenishment network ("RN") 138, which can include various servers and database systems for use in verifying added value to subscriber accounts. For instance, replenishment network 138 may include a credit card verification system, for verifying charges to credit cards that are used as payment for additional minutes of telecommunication services. As another example, replenishment network 138 may include an airline-miles verification system, for verifying charges to airline miles accounts used as prepayment for telecommunications services.

As indicated above, SCP 124 may communicate with calculation engine 130 through a Generic Data Interface ("GDI") such as Bellcore's SR-3389. The GDI is a service-independent system that allows an SCP and an external system to define data that is to be exchanged for desired services. As such, GDI provides some general message sets that can be used for communications between the SCP and the calculation engine. For example, GDI provides an "InvokeApp" request message that is used to invoke a specified application on an external system. The request message can include an "appName" parameter that identifies the application to be executed and an "InvokeAppReq" parameter that has any specified meaning. In turn, an InvokeApp response message can include an "InvokeAppResp" parameter that can indicate the results of the application executed.

Thus, in response to an account balance call request, for instance, AB service logic module 234 may send an Invoke-App request via link 132 to CE logic module 240, invoking a balance-check application of logic module 240. The InvokeAppReq parameter in the request message may convey an identification of the mobile station or customer account having the associated account balance. In response, CE logic module 240 may consult account balance database 242 to verify an available balance and then send an InvokeApp response message to AB service logic module 234 indicating that the call can proceed. Similarly, as an account balance call progresses, CE logic module 240 may time the call and decrement the balance accordingly, and when the balance drops to a low threshold level, CE logic module 240 may send an InvokeApp request message to AB service logic module 234 to advise SCP 124 of the low balance. Alternatively, CE logic module 240 may return the available account balance to SCP 124 in an InvokeApp response message, and then SCP 124 may time the call, decrement the balance and notify calculation engine 130 of the new balance when the call is completed; CE logic module 240 may then write the revised balance to database 242.

As another example, GDI also provides "SendData" and "GetData" message sets. The "SendData" message set is intended to be used to update data element values on an external system. In the "SendData" query message, the data elements to be updated and their new values are passed in a "dataElementsUpdated" block. In turn, a "SendData" reply message is used to indicate the success or failure of the SendData request. The "GetData" message set is intended to query an external system for data. A "GetData" query message includes a list of data elements to be retrieved, and a "GetData" response message includes a "dataElementsReturned" block with the values of the requested data elements.

Thus, in a possible embodiment, AB service logic module 234 may notify CE logic module 240 of the start or end of an account balance call by MS 102, by sending a "SendData" query message to CE logic module 240, identifying the mobile station in the "dataElementsUpdated" block, and CE logic module 240 may confirm receipt of the request by sending a "SendData" reply message. Similarly, in another possible embodiment, AB service logic module 234 may query CE logic module 240 for the account balance available to MS 102 by sending a "GetData" message to CE logic module 240, and CE logic module 240 may respond by returning the balance in the "dataElementsReturned" block. Other examples exist as well.

As further indicated above, SCP 124 may communicate with IP 120 via an SCP-IP interface such as Bellcore's SR-3511. The SR-3511 interface defines a message set for communication between an SCP and an IP. This message set includes a number of query requests and responses. As specified by SR-3511, for instance, the IP may send a "ProvideInstructions" message to the SCP to ask the SCP for information on handling a call. In addition, the SCP may send a "SendToResource" message to the IP to reserve a port on the IP and to retrieve the associated dialed number (i.e., a network address for sending a call to that port on the IP). In response to a SendToResource message, the IP sends a "SendToResourceResult" message to the SCP, providing an IP dialed number. SR-3511 also defines several mid-call instructional messages. For instance, the SCP may send a "CallInfoToResource" message to the IP to inform the IP to play messages to the caller or collect and return digits entered by the caller, or to initiate normal call termination. In response, the IP may send a "CallInfoFromResource" message providing a result code or collected digits. Details of these and other messages are provided in the SR-3511 specification, which has been incorporated by reference.

In accordance with the exemplary embodiment, when MSC 110 receives an account balance call request, it seeks to set up the call with IP 120 (or other designated network entity) via an outbound looparound trunk. IP 120 then responsively seeks to set up the call back through MSC 110 through an inbound looparound trunk. As a result, the call is routed through a looparound circuit at MSC 110, while the corresponding ISUP signaling path extends through the IP 120. By seeing messages that flow through this ISUP signaling path, IP 120 knows when the call starts and stops and can advise SCP 124 accordingly. In addition, when instructed by SCP 124 for instance, IP 120 can readily terminate the call by sending a REL message to MSC 110, or IP 120 can play a message or collect digits and send the digits to SCP 124.

As with any call that is destined for a particular address in network 100, MSC 110 needs to know which trunk (or trunk group) it should use to route an account balance call. Thus, in the exemplary embodiment, MSC 110 needs to know that it should seek to route an account balance call via an outbound looparound trunk to a port at IP 120. As indicated above, current WIN SCPs are not able to provide trunk ID instructions to an MSC. Thus, there are currently two ways to tell an MSC that it should route an account balance call via a particular trunk.

One way is to program the MSC to recognize an account balance service code (e.g., *65) dialed from a mobile station having account balance service. The MSC would then recognize the service code and responsively set up the call to be routed via an outbound looparound trunk. A problem with this technique, however, is that it would require a user to dial the service code in order to activate the service in each instance. In addition, another problem with this technique is that it would work only for calls originating from the mobile station having account balance service; the MSC would have no way to know that a call arriving for (i.e., terminating at) an account balance subscriber station should be charged against the terminating station's balance.

Another way is to allow only a limited set of numbers (e.g., telephone numbers or other network addresses) for mobile stations having account balance service, and to program the MSC to recognize calls to or from such numbers as account balance calls. When the MSC receives an originating or terminating call attempt for a mobile station having account balance service, the MSC would thus treat the call as an account balance call and would responsively set up the call to be routed via an outbound looparound trunk. Numerous problems with this technique were described above.

As presently contemplated, these deficiencies can be avoided by having an SCP concatenate an account balance service code with a destination address, and then returning the combined information to the MSC. When the MSC receives this information, its switching logic will then recognize the service code and responsively set up the call to be routed via an outbound looparound circuit to the destination address. Advantageously, with this method, no restriction is placed on mobile station numbers, since any mobile station can be set up for account balance service by providing an indication in the mobile station service profile that the mobile station subscribes to the service. Further, this method does not require an account balance customer to send a service code with every call, and it allows calls terminating at a mobile station, as well as calls originating from the mobile station, to be charged against the account balance associated with the mobile station.

Example AB Scenarios

Referring next to FIG. 9, there is shown a flow chart illustrating the processing of an account balance call according to an exemplary embodiment of the present invention. Portions of this process flow are also illustrated by a block diagram in FIG. 10. This example process flow assumes that an account balance for MS 102 has been established in advance, and that the account balance is stored in database 242 on calculation engine 130. Further, the example assumes that MS 102 originates a call to a destination address in network 100. It should be understood of course that this example is not intended to be limiting and that many variations are possible. For instance, rather than originating at MS 102, the call may terminate at MS 102. As another example, the call may be a multi-party call involving MS 102. As yet another example, the account balance may be stored at another location.

Beginning at step 250 in FIG. 9, MSC 110 receives a call request from MS 102. The call request defines a request to connect a call from an originating station (e.g., MS 102) to a terminating station (e.g., station 144 or any other network address in a wireless or landline network). In network 100, the originating station may be identified by a label such as a PSTN telephone number, a mobile-station identificaiton number (MSID), an IP address, an e-mail address, or the like, which may be referred to as an originating-identifier. Similarly, the terminating station may be identified by a label that may be referred to as a terminating-identifier.

At step 252, in response to the call request, the MSC generates and sends a TCAP query message to a service controller such as SCP 124 via STP network 116, requesting call-handling instructions. The query message may define certain call-request information, such as the label identifying MS 102 (e.g., the MSID of MS 102) and the destination address (e.g., dialed number), or other indicia associated with the originating and terminating stations. At step 254, the SCP receives the TCAP query message and analyzes its parameters. At step 256, based on the call-request information, the SCP determines that the call is a predefined type of call, namely (in this example) an account balance call. To make this determination, for instance, SCP base service logic module 230 may examine the service profile of MS 102 listed in database 232 and learn that MS 102 has account balance service.

At step 258, the SCP sends a message to calculation engine 130 to verify that MS 102 has at least a minimum balance necessary to support the call, or to otherwise verify or validate the account balance for MS 102. For instance, AB service logic module 234 in SCP may send an InvokeApp message to CE logic module 240 in the calculation engine, identifying MS 102 by MSID or other indicia. At step 260, the calculation engine reads or otherwise obtains the balance for MS 102 to determine whether it is sufficient. If the calculation engine determines that the balance is sufficient, then, at step 262, it sends a response message to SCP 124 indicating that the call can proceed and providing an indication of the available balance. For instance, the CE logic module may send an InvokeApp response message to the SCP with the available balance as a response parameter. Alternatively, the calculation engine may send balance information to the SCP, and the SCP itself may determine if the balance is sufficient.

Having verified the account balance for MS 102, the SCP next begins arrangements with IP 120 to create a looparound circuit at MSC 110 with a signaling path extending through the IP. At step 264, the SCP sends a message to the IP asking the IP to reserve a port for a call from MSC 110. This message may be an SR-3511 SendToResource message for instance. The IP responsively reserves a port and, at step 266, sends the reserved port address to the SCP in a SendToResourceResult message for instance. At step 268, the SCP generates a response TCAP message, which defines call-handling information for the MSC. The call-handling information provided by the SCP preferably specifies the reserved IP port address as the destination network address (e.g., dialed number, or routing number) and further includes a service code associated with the predefined type of call, i.e., an account balance service code (e.g., *65). In the exemplary embodiment, the SCP concatenates the service code with the destination network address (e.g., *65-987-555-1234). This account balance service code can be the same as or different than the account balance service code that a subscriber might dial from MS 102.

Figure 10:
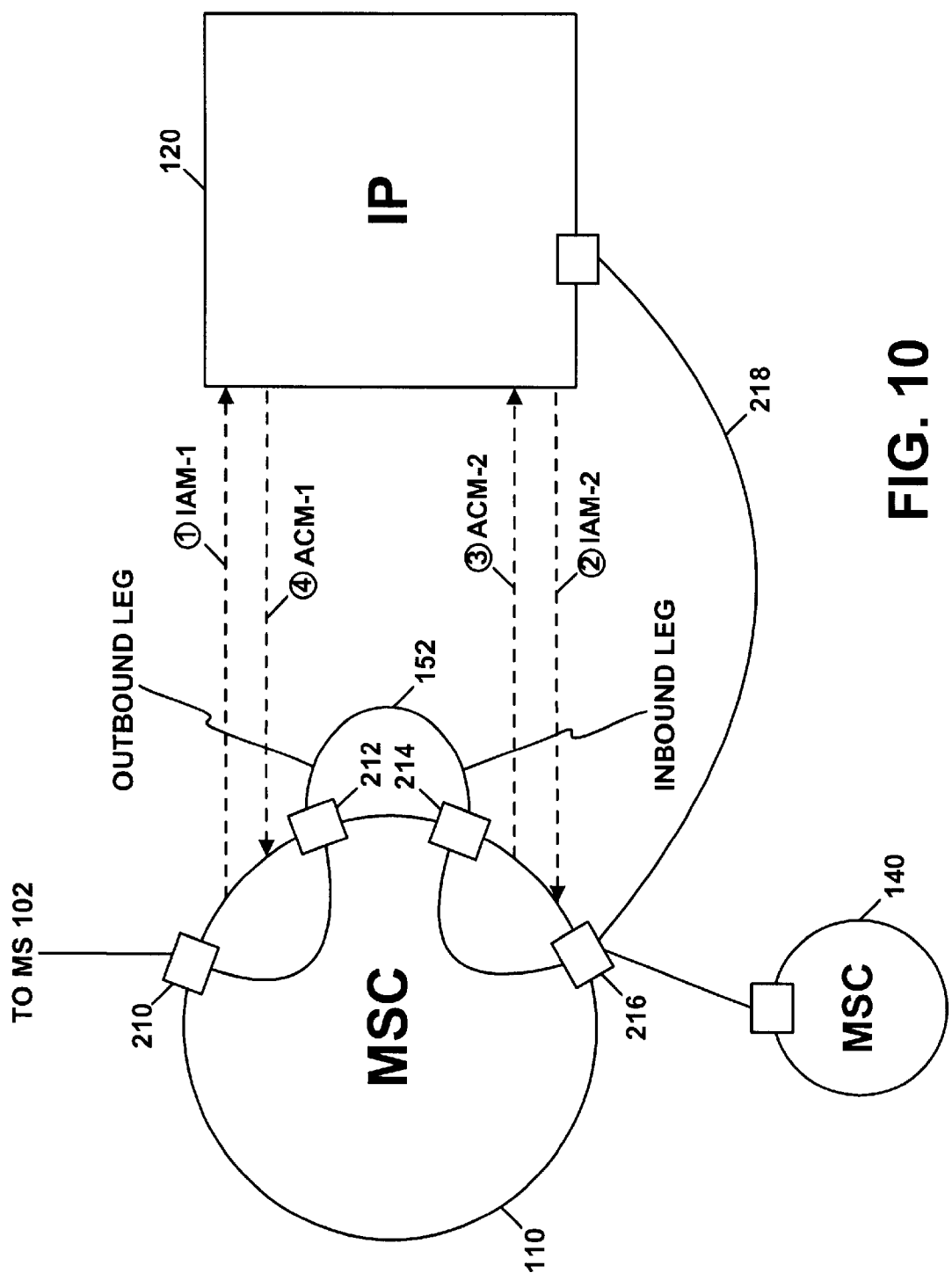
FIG. 10 is a block diagram illustrating a portion of the process flow depicted in FIG. 9.

At step 270, the MSC receives and analyzes the response TCAP message. The MSC recognizes the service code in the response message and therefore consults its translation table 210 for routing instructions. As discussed above, for this service code, the translation table may specify that MSC 110 should set up the call to be routed to the destination network address on a specific trunk (or any of a group of trunks), which happens to be an outbound looparound trunk, say trunk (port) 212. Therefore, at step 272, the MSC sends an IAM call setup message (IAM,) via STP network 116 to the network element designated in the response TCAP message (IP 120), seeking to set up a call to the reserved IP port via outbound looparound trunk 212. The effect of this message is to set up an outbound leg of looparound circuit 152 at the MSC, as shown in FIG. 10.

When the IP receives this IAM, message, at step 274, it contacts the SCP to request instructions for proceeding. For instance, the IP may send a CallInfoFromResource message to SCP 124. At step 276, the SCP instructs the IP to reserve a port to which the MSC may connect the call so that the IP can announce the balance to the user at MS 102. Thus, the SCP may send a SendToResource message to the IP for example. As a parameter of this message, the SCP may report to the IP the available account balance, which the IP may subsequently announce to the mobile station. In turn, at step 278, the IP may respond to the SCP with a SendToResourceResult message for example acknowledging the intent to establish a new outbound call leg with the MSC. In addition, at step 280, the IP generates and sends to the MSC a second IAM message (IAM$_2$) via STP network 116, which directs the MSC to receive the call on inbound looparound trunk 214 and route the call the reserved IP port. Based on prior arrangements with the MSC a reserved phone number is used by the IP to terminate the IAM$_2$ message using the inbound looparound trunk 214. The IAM calling party number will be an IP assigned number and the called party number will be the IP port used to play the account balance information. The effect of this message is to nail up the inbound leg of the looparound circuit 152 at the MSC and to have the MSC connect the call from mobile station 102 to the IP via trunk 218, as shown in FIG. 10.

At step 282, when the MSC receives IAM$_2$, it conventionally responds with an ACM message (ACM$_2$), confirming that it is prepared to connect the call to the reserved port of the IP. In turn, at step 284, the IP sends an ACM message (ACM$_1$) in response to IAM$_1$. Through this exchange of ISUP messages, the MSC thus routes the call from outbound looparound trunk 212, to inbound looparound trunk 214, and then via trunk 218 to the reserved port of the IP. At step 284, the IP answers the call, and the MSC sends an ANM$_2$ message to the IP and the IP sends an ANM$_1$ message to the MSC. At step 286, the IP then plays an announcement to MS 102 indicating the available balance.

At step 288, after having played the balance announcement, the IP terminates the call along trunk 218. In response, the MSC sends a REL message (REL$_2$) to the IP, seeking to release the inbound leg of the looparound circuit. In turn, rather than of responsively forwarding a REL message to the MSC to release the outbound looparound trunk, the IP holds onto the outbound leg, to maintain control of the call. At step 290, the IP sends a RLC message (RLC$_2$) to the MSC to confirm release of the inbound leg of the looparound circuit and to complete teardown of call path 218.

Next, at step 292, the IP sends a message to the SCP requesting instructions for proceeding. This may be a "ProvideInstructions" message, for instance. At step 294, SCP 124 responsively sends a message, such as a SendToResource message to the IP, asking the IP to reserve a port for use in completing the looparound circuit again. At step 296, the IP responds with a message such as a SendToResourceResponse message. At step 298, the SCP then prepares to begin timing the call.

At step 300, the IP sends a third IAM message (IAM$_3$) to the MSC, directing the MSC to receive the call on inbound looparound trunk 214 and to route the call to the destination address initially dialed by MS 102 (i.e., to remote MSC 140). The destination digits are provided to the IP by the SCP, perhaps using a SwitchInfoToResource message instructing the IP to join calls. The calls to be joined are sent to the IP from the SCP, perhaps using the previous SendToResource Message. At step 302, the MSC then responsively sends an ACM message (ACM$_3$) to the IP and sets up the call to the called station.

At step 304, when the called station answers, MSC 110 sends an ANM message (ANM$_3$) to the IP. In turn, at step 306, the IP sends a ProvideInstructions message including the Originating Station DN optional ResourceDigits paramter to the SCP advising the SCP that the call has started. At step 308, the AB service logic 234 of SCP 124 responsively begins to time the call. Alternatively, the AB service logic may notify the calculation engine 130 (through an InvokeApp message, for instance) that the call has started, and the calculation engine may begin to time the call.

At step 310, when the call ends, MSC 110 conventionally sends a REL message (REL$_3$) to the IP in an effort to release the full call path. In response, at step 312, the IP sends a RLC message (RLC$_3$) to MSC 110, thereby tearing down the call. In addition, at step 314, the IP sends a message to the SCP seeking instructions for proceeding. This message may be a ProvideInstructions message. Contained in the ProvideInstructions message is notification to stop timing the call based on the Originating Station DN optional ResourceDigits parameter. In response to this message, at step 316, the AB service logic 234 stops timing the call. Alternatively, if the calculation engine is timing the call, the AB service logic may notify the calculation engine that the call has ended, and the calculation engine may stop the timer.

At step 318, the SCP then sends a message to the IP telling the IP to terminate the call. This message may be a CallInfoToResource message with a parameter IpStayOnLine set to FALSE. In response, at step 320, the IP sends a REL message (REL$_1$) to the MSC, and, at step 322, the MSC sends a RLC message (RLC$_1$) to the IP, thereby tearing down the remainder of the looparound circuit. In addition, at step 324, IP responds to the CallInfoToResource message by sending a SR-3511 "ResourceClear" message to the SCP, thereby completing the account balance call transaction.

Upon completion of the account balance call transaction, at step 326, the SCP sends a message to the calculation engine 130 to update the account balance. At step 328, the calculation engine updates the account balance by writing a revised balance to database 242. Finally, at step 329, the calculation engine responsively sends a message back to the SCP confirming the account balance update. Alternatively, if the calculation engine was timing the call, it may autonomously update the account balance when it learns that the call has ended.

Returning now to step 260, in an alternative scenario, the calculation engine may determine, when the call is initiated, that the account balance for MS 102 is not sufficient to support the requested call. In that case, in the exemplary embodiment, at step 330, the calculation engine sends a message to the SCP indicating that the balance is low (or zero) and instructing the SCP to deny the call. In response, at step 332, the routine of steps 264-272 is performed, thereby establishing looparound circuit 152 and connecting MS 102 via path 218 to a reserved port at the IP. With this connection established, at step 334, the IP account balance logic module then invokes a credit card collection interface, which interacts with the user at MS 102 to collect credit card payment for additional minutes. In the exemplary embodiment, the IP may have obtained the instructions for invoking the credit card collection application in the SendToResource message sent previously by the SCP. Once the credit information has been collected the IP would send a balance update to the SCP using the ProvideInstructions message.

In another alternative scenario, it is possible that the SCP may determine that the account balance has dropped to a threshold low level during the call or has been depleted, as shown at step 336. In that event, at step 338, the SCP may send a message to the IP instructing the IP to interject a message into the call, to collect credit card payment for increased balance, to terminate the call or to take any other desired action. This message may be a CallInfoToResource message, for instance. At step 340, the IP acknowledges the request by sending a message, such as a CallInfoFromResource message, to the SCP and prepares to take the action requested.

As one possibility, as shown at step 342, the IP may cause the call to be disconnected from the called party. Numerous techniques can be employed to accomplish this. According to one method, the IP may simply send a REL message to the MSC, directing the MSC to release the inbound or outbound leg of the looparound circuit. MSC would then release the designated leg, thereby disconnecting the call. Another option is to tear the call all the way down and require the caller to re-originate the call, in which case the balance could be checked and the call routed to the IP for payment collection as described above.

As another possibility, as shown at step 344, the IP may cause the call to be redirected from the called party to the IP, so that the IP can play a message and collect additional prepayment. To accomplish this, for instance, the IP may send a REL message to the MSC, directing the MSC to disconnect the inbound leg of the looparound circuit. After the inbound leg is disconnected, the IP may then send an IAM message to the MSC, directing the MSC to receive the call on the inbound looparound trunk and to again route the call to a reserved IP port. Once the call is connected to the IP port, the IP may then play an announcement to the subscriber, collect additional prepayment, and so forth.

In an exemplary embodiment, the inbound looparound port at MSC 110 can be a conference bridge. In that case, the IP can send an IAM message to MSC directing the MSC to add the IP to the call without disconnecting the called party. The IP may then play an announcement to the subscriber and collect additional prepayment. Once the IP completes its tasks, the IP may then send a REL message to the MSC, directing the MSC to release the IP from the conference call, and allowing the call to proceed.

In another embodiment, the IP may cause the MSC to redirect the call to the IP, by sending an IS-41 "RedirectionDirective" message to the MSC. Traditionally, the RedirectionDirective message has been used in wireless networks to cause one cell to hand off a call to another cell. However, the same message set can be applied more generally to cause one network element (such as MSC 110) to hand off the call to another network element (such as IP 120). For instance, a translation table can be set up in the MSC, authorizing the MSC to hand off calls to the IP in response to a RedirectionDirective message.

Alternative Applications

An exemplary embodiment of the present invention has been illustrated and described. It will be understood, however, that changes and modifications may be made to the invention without deviating from the spirit and scope of the invention, as defined by the following claims.

For instance, although the foregoing description focuses on account balance service in a wireless telecommunications network, the present invention can equally extend to use in a landline network or to a combination landline/wireless network. In that case, a landline station might replace the mobile station, and a more general SSP might replace the MSC. In addition, a more general service profile database might replace the service profile database at the SCP, and the SSP and SCP might be programmed with landline AIN message sets and functions analogous to those described above.

In addition, while the above discussion is directed to a traditional circuit switched telecommunications network, the invention can equally apply in a packet switched network. In this regard, packet networks such as the Internet are increasingly being used to carry voice and other data that was traditionally carried over circuit-switched networks. This technology is often described as Internet telephony or voice over Internet Protocol ("VoIP"). In a packet switched telecommunications network, a router might take the place of a switch, and an application server might take the place of an SCP. However, the general messaging framework set forth above could apply just as well.

Finally, as indicated, the architecture and messaging outlined above can broadly facilitate many other services in addition to account balance service. In particular, by inserting an IP or other designated element in the ISUP signaling path of a call as described above, a service provider can readily monitor the status of the call and take any desired action in response.

We claim:

1. In a telecommunications network of the type including a switch and a service controller, a method for monitoring call traffic comprising the steps of:

said switch receiving a call request to connect a call to a destination number;

said switch requesting call-handling instructions from said service controller;

said service controller responsively providing to said switch a service-code and a network address;

in response to at least said service-code and said network address, said switch seeking to set up a call with a designated network element via an outbound looparound trunk;

said switch and said designated network element engaging in call setup communications and thereby routing said call through a looparound circuit at said switch, while maintaining an associated signaling path through said designated network element, whereby signaling messages conveyed along said signaling path through said designated element indicate a status of said call.

2. A method as claimed in claim 1, wherein said service-code identifies said call as an account-balance call.

3. In a telecommunications network of the type including a plurality of stations, a switch, and a service controller, said switch and said service controller each being coupled to a signaling sub-network, a method for monitoring call traffic comprising the steps of:

said switch receiving a call request defining a request to connect a call from an originating station to a terminating station;

in response to said call request, said switch sending a query message to said service controller via said signaling sub-network, said query message defining call-request information;

said service controller receiving said query message and, based on said call request information, identifying said call as a predefined type of call;

said service controller sending a response message to said switch via said signaling sub-network, said response message defining call-handling information including a service-code associated with said predefined type of call;

said switch receiving said response message and, responsive to said call-handling information, seeking to set up a call to a designated element in said telecommunications network via an outbound looparound trunk; and said switch and said designated element engaging in communication of signaling messages and thereby setting up a call connection to said terminating station through a looparound circuit at said switch while maintaining an associated signaling path through said designated element, whereby, signaling messages conveyed along said signaling path through said designated element indicate a call-status such as a beginning or end of said call.

4. A method as claimed in claim 3 wherein said designated element comprises an intelligent peripheral.

5. A method as claimed in claim 3 further comprising said designated element communicating with said service controller in response to a signaling message conveyed along said signaling path through said designated element, thereby apprising said service controller of said call-status.

6. A method as claimed in claim 3 wherein said designated element is said service controller, whereby said service controller may monitor said call-status by reference to said signaling messages.

7. A method as claimed in claim 3 wherein said predefined type of call is an account-balance call.

8. A method as claimed in claim 7 further comprising, in combination:

said switch connecting said call to said designated element before connecting said call to said terminating station; and said designated element announcing a subscriber account balance.

9. A method as claimed in claim 7 further comprising, in combination:

said designated element communicating with said service controller in response to a signaling message conveyed along said signaling path through said designated element, and thereby apprising said service controller of a start of said call; and said service controller responsively monitoring a subscriber account balance as said call progresses.

10. A method as claimed in claim 9, further comprising said service controller decrementing said subscriber account balance as said call progresses.

11. A method as claimed in claim 10, wherein said service controller decrements said subscriber account balance at a rate defined per unit time.

12. A method as claimed in claim 3, wherein said originating station defines an originating-identifier, and said terminating station defines a terminating-identifier, said originating-identifier and terminating-identifier each being selected from the group consisting of (i) a PSTN telephone number, (ii) a mobile-station identifier, (iii) an IP address and (iv) an e-mail address.

13. A method as claimed in claim 12, wherein identifying said call as said predefined type of call comprises querying a profile database keyed to indicia selected from the group consisting of said originating-identifier and said terminating-identifier.

14. A method as claimed in claim 3, wherein said switch serves said originating station.

15. A method as claimed in claim 3, wherein said switch serves said terminating station.

16. In telecommunications network of the type including a plurality of stations, a switch, and a service controller, a system for monitoring call traffic passing through said switch, said system comprising, in combination:

a looparound trunk at said switch;

a first call-processing routine stored in said switch and executed by a processor when said switch receives a request to connect a call from an originating station to a terminating station, said first call-processing routing generating a query message including indicia associated respectively with said originating station and said terminating station, said switch sending said query message to said service controller;

a second call-processing routine stored in said service controller and executed by a processor when said service controller receives said query message, said second call-processing routine determining, based on said indicia, that said call is a predetermined type of call, and said second call-processing routine generating a response message including a service-code identifying said call as said predefined type of call, said service controller sending said response message to said switch; and a third call-processing routine stored in said switch and executed by a processor when said switch receives said response message, said third call-processing routine translating said service-code into a request to route said call via said looparound trunk, said switch engaging in signaling communication with a designated element in said network and thereby routing said call via said looparound trunk to said destination while leaving an associated signaling path through said designated element, whereby, signaling messages conveyed along said signaling path through said designated element indicate a call-status such as a beginning or end of said call.

17. A system as claimed in claim 16, wherein said designated element comprises an intelligent peripheral.

18. A system as claimed in claim 16, wherein said service designated element is said service controller, whereby said service controller may monitor said call-status by reference to said signaling messages.

19. A system as claimed in claim 16, wherein said predefined type of call is an account-balance call.

20. In a telecommunications network of the type including a switch and a service controller, a method for monitoring call traffic comprising the steps of:

said switch receiving a call request to connect a call to a destination number;

said switch requesting call-handling instructions from said service controller;

said service controller responsively providing to said switch a combination of a service-code and a network address, whereas said service controller appends said service-code to said network address so as to produce the combination;

in response to at least said service-code and said network address, said switch seeking to set up a call with a designated network element via an outbound looparound trunk;

said switch and said designated network element engaging in call setup communications and thereby routing said call through a looparound circuit at said switch, while maintaining an associated signaling path through said designated network element;

whereby signaling messages conveyed along said signaling path through said designated element indicate a status of said call.

21. In a telecommunications network of the type including a plurality of stations, a switch, and a service controller, said switch and said service controller each being coupled to a signaling sub-network, a method for monitoring call traffic comprising the steps of:

said switch receiving a call request defining a request to connect a call from an originating station to a terminating stations;

in response to said call request, said switch sending a query message to said service controller via said signaling sub-network, said query message defining call-request information;

said service controller receiving said query message and, based on said call request information, identifying said call as a predefined type of call, said predefined type of call being an account-balance call;

said service controller sending a response message to said switch via said signaling sub-network, said response message defining call-handling information including a service-code associated with said predefined type of call;

said switch receiving said response message and, responsive to said call-handling information, seeking to set up a call to a designated element in said telecommunications network via an outbound looparound trunk;

said switch and said designated element engaging in communication of signaling messages and thereby setting up a call connection to said terminating station through a looparound circuit at said switch while maintaining an associated signaling path through said designated element, whereby signaling messages conveyed along said signaling path through said designated element indicate a call-status such as a beginning or end of said call;

said designed element communicating with said service controller in response to a signaling message conveyed along said signaling path through said designated element, and thereby apprising said service controller of a start of said call;

said service controller responsively monitoring a subscriber account balance as said call progresses;

said service controller instructing said designated element to release said call when said subscriber account balance reaches a threshold level; and said designated element responsively sending a release-message to release said call.

22. A method as claimed in claim 21, further comprising said switch receiving said release-message, and said switch opening said looparound circuit and thereby releasing said call.

23. In a telecommunications network of the type including a plurality of stations, a switch, and a service controller, said switch and said service controller each being coupled to a signaling sub-network, a method for monitoring call traffic comprising the steps of:

said switch receiving a call request defining a request to connect a call from an originating station to a terminating station;

in response to said call request, said switch sending a query message to said service controller via said signaling sub-network, said query message defining call-request information;

said service controller receiving said query message and, abased on said call request information, identifying said call as a predefined type of call, said predefined type of call being an account-balance call;

said service controller sending a response message to said switch via said signaling sub-network, said response message defining call-handling information including a service-code associated with said predefined type of call;

said switch receiving said response message and, responsive to said call-handling information, seeking to set up a call to a designated element in said telecommunications network via an outbound looparound trunk;

said switch and said designated element engaging in communication of signaling messages and thereby setting up a call connection to said terminating station through a looparound circuit at said switch while maintaining an associated signaling path through said designated element, whereby signaling messages conveyed along said signaling path through said designated element indicate a call-status such as a beginning or end of said call;

said designed element communicating with said service controller in response to a signaling message conveyed along said signaling path through said designated element, and thereby apprising said service controller of a start of said call;

said service controller responsively monitoring a subscriber account balance as said call progresses; and said service controller being coupled with a call-calculation engine and said call-calculation engine decrementing said subscriber account balance as said call progresses and notifying said service controller when said subscriber account balance reaches a threshold level.

24. In a telecommunications network of the type including a plurality of stations, a switch, and a service controller, said switch and said service controller each being coupled to a signaling sub-network, a method for monitoring call traffic comprising the steps of:

said switch receiving a call request defining a request to connect a call from an originating station to a terminating station;

in response to said call request, said switch sending a query message to said service controller via said signaling sub-network, said query message defining call-request information;

said service controller receiving said query message and, based on said call request information, identifying said call as a predefined type of call;

said service controller concatenating (i) a service-code associated with a predefined type of call with (ii) a network address of a designated element, so as to produce a combined directive that includes the service-code concatenated with the network address;

said service controller sending a response message to said switch via said signaling sub-network, said response message defining call-handling information including the combined directive;

said switch receiving said response message, detecting said service-code, and responsively seeking to set up a call to a designated element in said telecommunications network via an outbound looparound trunk; and said switch and said designated element engaging in communication of signaling messages and thereby setting up a call connection to said terminating station through a looparound circuit at said switch while maintaining an associated signaling path through said designated element, whereby, signaling messages conveyed along said signaling path through said designated element indicate a call-status such as a beginning or end of said call.

25. In telecommunications network of the type including a plurality of stations, a switch, and a service controller, a system for monitoring call traffic passing through said switch, said system comprising, in combination:

a looparound trunk at said switch;

a first call-processing routine stored in said switch and executed by a processor when said switch receives a request to connect a call from an originating station to a terminating station, said first call-processing routing generating a query message including indicia associated respectively with said originating station and said terminating station, said switch sending said query message to said service controller;

a second call-processing routine stored in said service controller and executed by a processor when said service controller receives said query message said second call-processing routine determining, based on said indicia, that said call is predetermined type of call, and said second call-processing routine generating a response message including a service-code concatenated with a routing number, the service-code identifying said call as said predefined type of call, and the routing number identifying a designated element in said network;

a third call-processing routine stored in said switch and executed by a processor when said switch receives said response message, said third call-processing routine translating said service-code into a request to route said call via said looparound trunk, said switch engaging in signaling communication with said designated element and thereby routing said call via said looparound trunk to said destination while leaving an associated signaling path through said designated element, whereby, signaling messages conveyed along said signaling path through said designated element indicate a call-status such as a beginning or end of said call.

* * * * *